United States Patent
Gorur Sheshagiri et al.

(10) Patent No.: US 10,373,360 B2
(45) Date of Patent: Aug. 6, 2019

(54) SYSTEMS AND METHODS FOR CONTENT-ADAPTIVE IMAGE STITCHING

(71) Applicant: QUALCOMM Incorporated, San Diego, CA (US)

(72) Inventors: Pushkar Gorur Sheshagiri, Bengaluru (IN); Chiranjib Choudhuri, Bangalore (IN); Sudipto Banerjee, Kolkata (IN); Ajit Deepak Gupte, Bangalore (IN); Pawan Kumar Baheti, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 15/447,827

(22) Filed: Mar. 2, 2017

(65) Prior Publication Data

US 2018/0253875 A1     Sep. 6, 2018

(51) Int. Cl.
*G06T 3/40* (2006.01)
*G06T 11/60* (2006.01)
*G06T 3/00* (2006.01)
*G06T 19/00* (2011.01)
*G06F 16/44* (2019.01)

(52) U.S. Cl.
CPC .......... *G06T 11/60* (2013.01); *G06F 16/444* (2019.01); *G06T 3/0062* (2013.01); *G06T 3/0081* (2013.01); *G06T 3/4038* (2013.01); *G06T 19/006* (2013.01)

(58) Field of Classification Search
CPC ............. H04N 5/23238; H04N 5/2621; H04N 5/23232; G06T 3/0062; G06T 3/4038; G06T 5/50; G06T 2207/2022; G06T 3/0093
See application file for complete search history.

(56) References Cited

U.S. PATENT DOCUMENTS

| | | | |
|---|---|---|---|
| 6,097,854 A | 8/2000 | Szeliski et al. | |
| 7,176,960 B1* | 2/2007 | Nayar | G06T 3/4038 |
| | | | 348/207.99 |
| 2001/0026684 A1 | 10/2001 | Sorek et al. | |
| 2003/0184778 A1 | 10/2003 | Chiba | |
| 2012/0263397 A1* | 10/2012 | Kimura | H04N 5/23238 |
| | | | 382/284 |

(Continued)

FOREIGN PATENT DOCUMENTS

WO    2016141543 A1    9/2016

OTHER PUBLICATIONS

Chia-Yen Chen, "Image Stitching—Comparisons and New Techniques", Computer Science Department of The University of Auckland CITR at Tamaki Campus, Oct. 1998, URL: http://www.citr.auckland.ac.nz/researchreports/CITR-TR-30.pdf.*

*Primary Examiner* — Diane M Wills
(74) *Attorney, Agent, or Firm* — Austin Rapp & Hardman, P.C.

(57) ABSTRACT

A method for stitching images by an electronic device is described. The method includes obtaining at least two images. The method also includes selecting a stitching scheme from a set of stitching schemes based on one or more content measures of the at least two images. The set of stitching schemes includes a first stitching scheme, a second stitching scheme, and a third stitching scheme. The method further includes stitching the at least two images based on a selected stitching scheme.

30 Claims, 18 Drawing Sheets

(56) References Cited

U.S. PATENT DOCUMENTS

| | | | |
|---|---|---|---|
| 2013/0124471 A1* | 5/2013 | Chen | H04N 5/23238 707/624 |
| 2013/0229581 A1 | 9/2013 | Joshi et al. | |
| 2014/0247352 A1* | 9/2014 | Rathi | B60R 1/00 348/148 |
| 2016/0191795 A1* | 6/2016 | Han | G06T 3/4038 348/36 |
| 2016/0360104 A1 | 12/2016 | Tao | |
| 2017/0006220 A1* | 1/2017 | Adsumilli | H04N 5/23238 |
| 2017/0345129 A1* | 11/2017 | Doshi | G06T 3/4038 |
| 2018/0025524 A1* | 1/2018 | Adsumilli | G06T 11/60 382/284 |

\* cited by examiner

SYSTEMS AND METHODS FOR CONTENT-ADAPTIVE IMAGE STITCHING

FIELD OF DISCLOSURE

The present disclosure relates generally to electronic devices. More specifically, the present disclosure relates to systems and methods for content-adaptive image stitching.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

Some kinds of images may be limited in view. Processing images to expand the view may be complex and may require a relatively large amount of processing resources to accomplish with high quality. Quality may be reduced as processing complexity is reduced. As can be observed from this discussion, systems and methods that improve image processing may be beneficial.

SUMMARY

A method for stitching images by an electronic device is described. The method includes obtaining at least two images. The method also includes selecting a stitching scheme from a set of stitching schemes based on one or more content measures of the at least two images. The set of stitching schemes includes a first stitching scheme, a second stitching scheme, and a third stitching scheme. The method further includes stitching the at least two images based on a selected stitching scheme.

The at least two images may be fisheye images. The method may include transforming overlapping outer regions of the at least two images into rectangular images using a geometrical transformation.

The method may include determining sub-regions of an overlapping region of the at least two images based on the one or more content measures. The method may include performing selecting the stitching scheme for each of the sub-regions. Different stitching schemes may be selected for at least two of the sub-regions. The one or more content measures may include one or more of a motion measure, a disparity measure, or a coverage measure.

The first stitching scheme may be static seam-based stitching, the second stitching scheme may be dynamic seam-based stitching, and the third stitching scheme may be dynamic warp stitching. Selecting the stitching scheme may include selecting static seam-based stitching in a case that a motion measure is greater than a motion threshold. Selecting the stitching scheme may also include determining whether a match is unreliable in a case that the motion measure is not greater than the motion threshold. Selecting the stitching scheme may further include selecting static seam-based stitching in a case that the match is unreliable.

Selecting the stitching scheme may include selecting dynamic warp stitching in a case that a disparity measure is greater than a disparity threshold or a coverage measure meets a coverage criterion. Selecting the stitching scheme may include selecting dynamic seam-based stitching in a case that a disparity measure is not greater than a disparity threshold and a coverage measure does not meet a coverage criterion.

The method may include selecting a blending region based on at least one of a motion measure or a disparity measure. The method may also include blending the at least two images in the blending region. The method may include constraining a dynamic seam to align at a sub-region boundary in a case that the selected stitching scheme is dynamic seam-based stitching.

Stitching the at least two images may produce a surround view image of a scene. Stitching the at least two images may include performing color correction based on a disparity measure.

An electronic device for stitching images is also described. The electronic device includes a memory and a processor coupled to the memory. The processor is configured to obtain at least two images. The processor is also configured to select a stitching scheme from a set of stitching schemes based on one or more content measures of the at least two images. The set of stitching schemes includes a first stitching scheme, a second stitching scheme, and a third stitching scheme. The processor is further configured to stitch the at least two images based on a selected stitching scheme.

A non-transitory tangible computer-readable medium storing computer executable code is also described. The executable code includes code for causing an electronic device to obtain at least two images. The executable code also includes code for causing the electronic device to select a stitching scheme from a set of stitching schemes based on one or more content measures of the at least two images. The set of stitching schemes includes a first stitching scheme, a second stitching scheme, and a third stitching scheme. The executable code further includes code for causing the electronic device to stitch the at least two images based on a selected stitching scheme.

DETAILED DESCRIPTION

Figure 1:
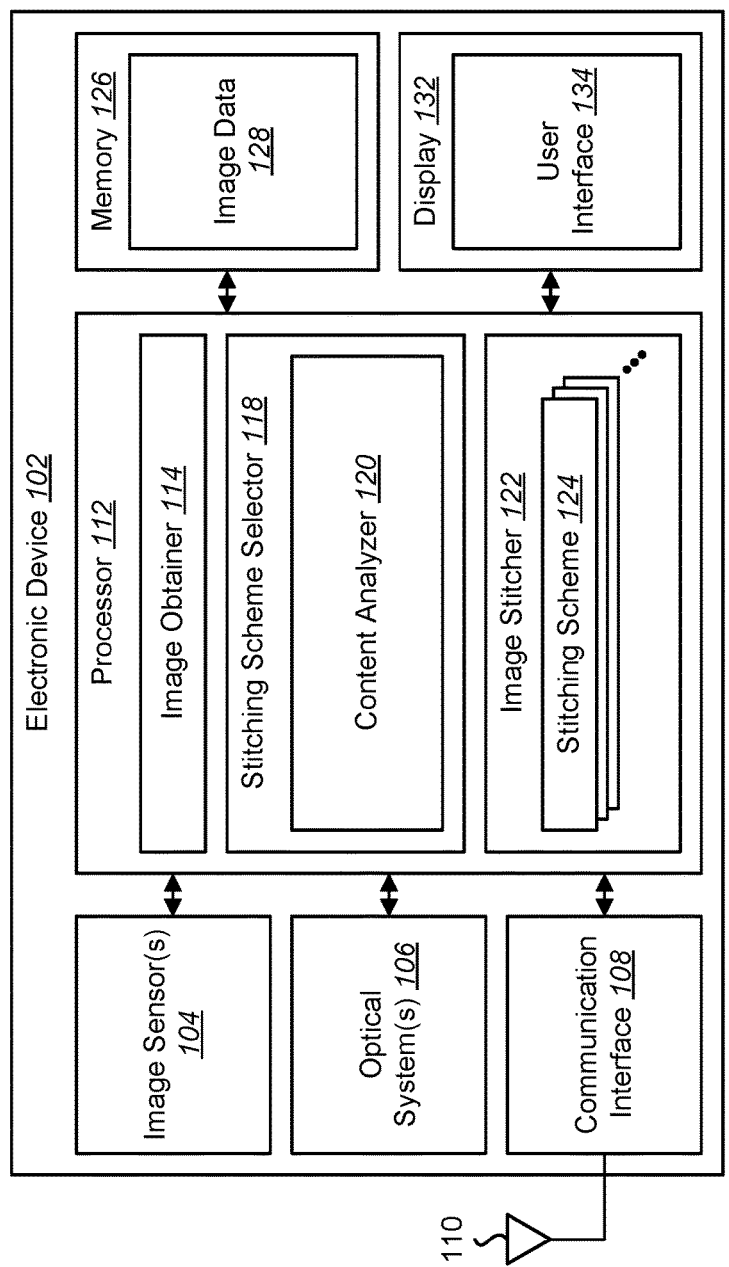
FIG. 1 is a block diagram illustrating one example of an electronic device in which systems and methods for stitching images may be implemented.

The systems and methods disclosed herein may relate to image stitching. For example, some configurations of the systems and methods disclosed herein may relate to content adaptive stitching of inputs from multiple cameras.

Wide-view camera (e.g., 360-degree camera) setups may increasingly gain importance, as they may serve multiple applications (e.g., virtual reality, surveillance, etc.). For example, a capture setup may include multiple cameras covering a wide field of view (FOV) (e.g., a 360-degree FOV) in horizontal and/or vertical directions. One setup may include a dual wide-angle lens-based capture system. For example, an electronic device may include two fish-eye cameras, each with a FOV greater than 180 degrees. Other setups may include multiple wide-angle cameras (e.g., eight or sixteen action cameras combined in a ring or spherical arrangement). Data from each camera may be concurrently (e.g., synchronously) captured and/or stitched together to generate a 360-degree canvas. It should be noted that the systems and methods disclosed herein may be applicable for image and/or video use-cases.

Some objectives of the systems and methods disclosed herein may include reducing (e.g., minimizing) parallax and/or motion artifacts (e.g., structure deformation, ghosting, etc.) in a stitched canvas (e.g., 360-degree stitched canvas) based on inputs from multiple cameras. For example, the difference between the optical centers of the cameras in multi-camera rigs may result in parallax error when stitching the respective inputs from these cameras. Object motion across the overlap region may lead to ghosting artifacts as well.

Different approaches may be utilized for stitching. Static seam-based stitching may stitch along a fixed seam in an overlapping region. Static seam-based stitching may be simple and less complex, but may show abrupt changes in objects near the camera due to parallax. While static seam-based stitching may be utilized due to complexity concerns, it may not yield very good quality in some cases. Dynamic seam-based stitching is another approach. For example, dynamic seam-based stitching may be utilized for producing panoramic images. Dynamic seam-based stitching may utilize a cost function-based approach to determine the seam. Dynamic seam-based stitching may not address structural continuity across the seam. Dynamic warp-based stitching is another approach. In some implementations, dynamic warp-based stitching may utilize a double seam in the overlapping region. Dynamic warp-based stitching may identify feature correspondences across the two seams and may stretch content in the overlap region to align these features. Dynamic warp-based stitching may potentially address parallax better than the above approaches, but may still damage the image if feature correspondences are false. The systems and methods disclosed herein may provide quality improvements in addressing some of the problems described above.

Some configurations of the systems and methods disclosed herein may provide an approach that is based on content in an overlapping region. For example, a stitching scheme may be selected based on the content in the overlapping region. In some configurations, the systems and methods disclosed herein may adaptively combine static seam, dynamic seam, and/or dynamic warp-based stitching techniques based on scene analysis. Techniques for scene analysis may include disparity vectors in two overlapping image regions, image motion in an overlapping region, and/or object detection (e.g., face detection) in an overlapping region.

Some configurations of the systems and methods disclosed herein may include determining a blending region size (e.g., width) adaptively based on motion and/or disparity in the overlapping area. For example, blending region size may be smaller with less motion and/or a large disparity or may be larger with more motion.

Some configurations of the systems and methods disclosed herein may include utilizing an alternate image representation of wide-angle (e.g., fisheye) images. For example, one or more overlapping regions of wide-angle images may be transformed to produce a transformed image. The transformed image may have a different shape than the original region. For example, a curved overlapping region of a wide-angle image may be transformed to produce a rectangular image. The transformed image may be utilized to compute stitching (e.g., warping map and/or dynamic seam, etc.). In some configurations, the alternate image representation (e.g., transformed image) may help to reduce stitching complexity (e.g., the complexity of dynamic seam and/or dynamic warp algorithms). Additionally or alternatively, the alternate image representation may help to avoid distortion that may be present near poles in an equi-rectangular image representation.

Some configurations of the systems and methods disclosed herein may include a technique to reduce computational complexity by limiting utilization of complex image processing. For example, some configurations of the systems and methods disclosed herein may use dynamic warp-based stitching in one or more sub-regions of an image (e.g., only where needed in the image).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for stitching images may be implemented. Examples of the electronic device 102 may include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., wide-angle images, telephoto images, stitched images, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, wide-angle images, telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle images, telephoto images, etc.). In some configurations, the image sensor(s) 104 may capture the one or more images. In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smartphone camera, etc.). In some configurations, the electronic device 102 may request and/or receive the one or more images via the communication interface 108. For example, the electronic device 102 may or may not include a camera (e.g., an image sensor 104 and/or optical system 106) and may receive images (e.g., wide-angle image(s), normal image(s), and/or telephoto image(s)) from one or more remote devices.

The memory 126 may store instructions and/or data. The processor 112 may access (e.g., read from and/or write to) the memory 126. Examples of instructions and/or data that may be stored by the memory 126 may include image data 128 (e.g., wide-angle image data, normal image data, telephoto image data, etc.), features, feature vectors, keypoint data, corner data, line segment data, transform data, seam data, image obtainer 114 instructions, stitching scheme selector 118 instructions, content analyzer 120 instructions, image stitcher 122 instructions, instructions corresponding to one or more stitching schemes 124, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images (e.g., wide-angle image(s), normal image(s), telephoto image(s), etc.) obtained by the electronic device 102 may be one or more video frames, one or more still images, and/or one or more burst frames, etc. It should be noted that the systems and methods disclosed herein may be applied to two or more images and/or to two or more series of images (e.g., multiple wide-angle video streams, multiple normal video streams, multiple telephoto video streams, combinations of different kinds of video streams, etc.).

The processor 112 may include and/or implement an image obtainer 114, a stitching scheme selector 118, and/or an image stitcher 122. In some configurations, the stitching scheme selector 118 may include a content analyzer 120. In some configurations, the image stitcher 122 may include one or more stitching schemes 124. It should be noted that one or more of the elements illustrated in the electronic device 102 and/or processor 112 may be optional. For example, the stitching scheme selector 118, the content analyzer 120, the image stitcher 122, and/or the stitching scheme(s) 124 may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement an image obtainer 114. One or more images (e.g., image frames, video, burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 and/or may be captured from one or more remote camera(s). In some configurations, the image obtainer 114 may obtain multiple images (e.g., multiple wide-angle images, multiple normal images, multiple telephoto images, and/or a combination of different kinds of images).

A wide-angle image may be captured with a wide-angle lens. A wide-angle lens may have a shorter focal length and a wider field of view (FOV) (e.g., a greater angular range) than a telephoto lens. For example, a wide-angle lens may have an equal or a shorter focal length and/or may provide an equal or a larger field of view than a "normal" lens. In one example, a 28 millimeter (mm) lens relative to a full-frame image sensor may be considered a "normal" lens. For instance, a lens with a 28 mm focal length may be utilized in smartphone cameras. Lenses with focal lengths equal to or shorter than a normal lens (e.g., 28 mm) (relative to a full-frame sensor, for example) may be considered "wide-angle" lenses, while lenses with focal lengths equal to or longer than a normal lens (e.g., 28 mm) may be considered "telephoto" lenses. In other examples, lenses with other lens focal lengths (e.g., 50 mm) may be considered "normal" lenses. It should be noted that the systems and methods disclosed herein may be implemented with multiple lenses of equal or different focal lengths. Configurations described herein with reference to two wide-angle lenses may be additionally or alternatively implemented with multiple (e.g., two or more) lenses with equal or different focal lengths and/or lenses of the same or different types (e.g., multiple wide-angle lenses, multiple telephoto lenses, a wide-angle lens and a telephoto lens, etc.).

It should be noted that a telephoto image may be captured with a telephoto lens. For example, the telephoto lens may have a narrower FOV (e.g., a lesser angular range) than a wide-angle lens. A telephoto lens may enable capturing greater detail and/or magnified images in comparison with a wide-angle lens. Additionally or alternatively, a telephoto lens may have a longer focal length, may provide equal or greater magnification, and/or may provide a smaller field of view than a "normal" lens.

In some configurations, the image obtainer 114 may request and/or receive one or more images (e.g., image frames, wide-angle images, telephoto images, etc.). For example, the image obtainer 114 may request and/or receive one or more images from a remote device (e.g., external camera(s), remote server, remote electronic device, etc.) via the communication interface 108.

The processor 112 may include and/or implement a stitching scheme selector 118. The stitching scheme selector 118 may select a stitching scheme 124 for stitching at least two images. For example, the stitching scheme selector 118 may select a stitching scheme 124 from a set of stitching schemes (e.g., two or more stitching schemes) based on one or more content measures. In some configurations, the stitching scheme selector 118 may select multiple stitching schemes for stitching the at least two images (e.g., for stitching two or more sub-regions of the images).

In some configurations, the stitching scheme selector 118 may include a content analyzer 120. The content analyzer 120 may analyze the content of one or more images to determine one or more content measures. Examples of content measures may include a motion measure, a disparity measure, a coverage measure, and/or an object detection measure, etc. In some configurations, the processor 112 (e.g., stitching scheme selector 118) may determine areas (e.g., sub-regions) of one or more images based on the content measures. In some configurations, the processor 112 (e.g., stitching scheme selector 118) may determine content measures for one or more areas (e.g., sub-regions) of one or more images.

In some configurations, the content analyzer 120 may determine the motion measure. The motion measure may be determined by comparing a current image (e.g., current frame, current rectangular image, etc.) to one or more past images (e.g., previous frame, previous rectangular image, etc.). In some approaches, for example, the images utilized to determine the motion measure may be taken at different times (from the same lens, sensor, camera, etc.). The motion measure may indicate an amount of movement between the images (e.g., current frame and previous frame). For example, the motion measure may indicate a distance (in pixels, for instance) that an object has moved between the images. Additionally or alternatively, the motion measure may indicate a number of different pixels between the images and/or a degree of difference (e.g., in color, luma, etc.) between the images. Additionally or alternatively, the motion measure may be based on motion sensor (e.g., accelerometer) data. For example, the motion measure may indicate an amount of movement (e.g., rotation, translation, etc.) of the electronic device 102 between images. It should be noted that the motion measure may quantify a difference (e.g., motion) over time (e.g., time and space).

In some configurations, the content analyzer 120 may determine the disparity measure. The disparity measure may be determined by comparing images. In some approaches, for example, the content analyzer 120 may compare images from different lenses, cameras, viewpoints, and/or perspectives. Additionally or alternatively, the images utilized to determine the disparity measure may be captured at approximately the same time (e.g., synchronously, concurrently, etc.). The disparity measure may indicate an amount of disparity (e.g., difference) between the images (e.g., stereoscopic images). For example, the disparity measure may indicate one or more distances (in pixels, for instance) between object positions in the images. In some approaches, the disparity measure may provide an indication of object depth. For example, an object with a relatively large disparity between images may be closer to the lenses, sensors, cameras, etc., while an object with less disparity may be further from the lenses, sensors, cameras, etc. Additionally or alternatively, the disparity measure may be based on depth sensor (e.g., time-of-flight camera, lidar, etc.) data. For example, the disparity measure may indicate an amount of distance (e.g., depth) between an object in the image and a depth sensor.

In some approaches, the stitching scheme selector 118 (e.g., content analyzer 120) may perform disparity filtering. For example, one or more disparity values of the disparity measure (e.g., disparity map) may be incorrect. The stitching scheme selector 118 (e.g., content analyzer 120) may remove, eliminate, and/or not consider one or more disparity values that do not meet one or more criteria. For instance, one or more disparity values that indicate a shift in an incorrect direction may be eliminated or not considered. Additionally or alternatively, one or more disparity values that are too large (e.g., that are beyond a threshold or that would go beyond an overlapping region) may be eliminated or not considered.

In some configurations, the content analyzer 120 may determine the coverage measure. For example, the coverage measure may be determined based on object detection (e.g., feature detection, keypoint detection, corner detection, etc.). In some approaches, for instance, the content analyzer 120 may determine a size of an object and/or a span of an object in an image. In some approaches, the content analyzer 120 may determine an object size, whether an object spans at least a portion of an image and/or whether the object is at least a particular size. The coverage measure may indicate the size of one or more objects, whether one or more objects span at least a portion of the image (e.g., 85% of image width, 85% of overlapping region width, etc.) and/or whether the one or more objects are at least a particular size. In some approaches, the content analyzer 120 may determine the coverage measure based on a distribution of features (e.g., keypoints, corners, etc.) detected in an image. For example, the content analyzer 120 may determine whether features (e.g., features, keypoints, corners, etc., corresponding to one or more objects) span a proportion of an image (e.g., a wide-angle image, an overlapping region, a rectangular image, etc.).

In some configurations, determining one or more content measures may be conditional. For example, a disparity measure and/or a coverage measure may be determined in a case that the motion measure is greater than a threshold. In other configurations, multiple content measures may be determined unconditionally for each set of images (e.g., for each pair of images for stitching). For example, each of the content measures may be determined regardless of the value of one or more other content measures.

The stitching scheme selector 118 may select one or more stitching schemes 124 based on the one or more content measures. For example, if the motion measure is greater than a motion threshold, the stitching scheme selector 118 may select static seam-based stitching. In some configurations, the stitching scheme selector 118 may determine whether a match is unreliable (if the motion measure is not greater than a threshold, for example). If the match is unreliable, the stitching scheme selector 118 may select static seam-based stitching. If the motion measure is not greater than the motion threshold (and/or if the match is reliable, for example), the stitching scheme selector 118 may determine whether the disparity measure is greater than a disparity threshold or whether the coverage measure meets a coverage criterion (e.g., a coverage threshold). If the disparity measure is greater than the disparity threshold or if the coverage measure meets the coverage criterion, the scheme selector 118 may select dynamic warp-based stitching. If the disparity measure is not greater than the disparity threshold or if the coverage measure does not meet the coverage criterion, the scheme selector 118 may select dynamic seam-based stitching.

In some configurations, the stitching scheme selector 118 may select a stitching scheme for each of a set of image areas (e.g., sub-regions). Accordingly, the stitching scheme selector 118 may select different stitching schemes for two or more areas. For example, the stitching scheme selector 118 may select static seam-based stitching for an area with an amount of motion (e.g., an area with a motion measure that is greater than a motion threshold). Additionally or alternatively, the stitching scheme selector 118 may select dynamic warp-based stitching for an area with an amount of disparity (e.g., an area with a disparity measure greater than a disparity threshold) or with an amount of coverage (e.g., an area with a coverage measure that meets a coverage criterion). Additionally or alternatively, the stitching scheme selector 118 may select dynamic seam-based stitching for an area without an amount of disparity (e.g., an area with a disparity measure not greater than a disparity threshold) and without an amount of coverage (e.g., an area with a coverage measure that does not meet a coverage criterion). It should be noted that an image area may include all or a portion of an image (e.g., an overlapping area, a rectangular image, a region, a sub-region, etc.). In some cases, the same stitching scheme may be used for all of the image areas (e.g., sub-regions). For example, if the entire overlapping area (e.g., overlapping region) has an amount of texture (e.g., a lot of texture, a threshold amount of texture, etc.), static seam-based stitching may be used for all of the sub-regions.

In some configurations, the processor 112 (e.g., stitching scheme selector 118, content analyzer 120, etc.) may determine image areas based on the content measure(s). For example, the content analyzer 120 may divide (e.g., partition) the images (e.g., overlapping region(s)) into areas that contain motion, nearby object(s), and/or one or more object(s) that cover a portion of the image (e.g., overlapping region(s)). In some approaches, one or more areas with an amount of motion (e.g., any detected motion or non-zero motion measure, a motion measure that is at least a motion partitioning threshold amount, etc.) may be separated from one or more areas with little or no motion. Additionally or alternatively, one or more areas with an amount of disparity (e.g., any detected disparity or non-zero disparity measure, a disparity measure that is at least a disparity partitioning threshold amount, etc.) may be separated from one or more areas with little or no disparity. Additionally or alternatively, one or more areas with an amount of object coverage (e.g., a coverage measure that is at least a coverage partitioning threshold amount, etc.) may be separated from one or more areas with little or no object coverage (e.g., nearby object coverage, foreground object coverage, etc.). In some approaches, the image(s) (e.g., overlapping region, etc.) may be partitioned along one or more straight lines. Additionally or alternatively, the image(s) may be partitioned along a seam that may be linear and/or curved (e.g., meandering). A stitching scheme may be selected for each of the areas.

In some configurations, the electronic device 102 (e.g., processor 112, stitching scheme selector, image stitcher 122, etc.) may select one or more blending regions. A blending region may be an area for blending at least two images (in an overlapping region, for instance). For example, a blending region may be an area along a seam in which two images may be blended. Selecting the blending region(s) may be based on one or more content measures. For example, the blending region(s) (e.g., blending region size(s)) may be selected based on a motion measure and/or a disparity measure (in one or more overlapping regions, for example). In some approaches, the blending region may be larger for areas with larger motion (e.g., larger motion measure). For areas with large motion, a larger blending region may help to reduce a potential flickering artifact. For example, the blending region size may be a function of the motion measure (e.g., the blending region size may increase with increasing motion measure). The blending region may be smaller for areas with less motion (e.g., more static content). For areas with approximately static content, a small blending region may help to reduce a potential ghosting artifact due to parallax. Additionally or alternatively, for areas with a large disparity (e.g., with a disparity measure greater than a disparity threshold, for example), a small blending region may help to reduce a potential ghosting artifact due to parallax. The electronic device 102 (e.g., processor 112, image stitcher 122, etc.) may blend the images in the blending region. It should be noted that the blending region may be smaller than the overlapping region. Blending the images may produce a blended output, which may be a weighted combination of the images (e.g., two input images).

In some configurations, the electronic device 102 (e.g., processor 112, image obtainer 114, stitching scheme selector 118, etc.) may transform one or more areas of one or more images. Transforming one or more areas of the image(s) may reduce computational complexity for content analysis and/or stitching scheme selection. For example, the electronic device 102 may transform one or more overlapping regions of one or more images. In some approaches, the image obtainer 114 may obtain wide-angle (e.g., fisheye) images. The electronic device 102 may transform the overlapping regions in the wide-angle images into rectangular images using a geometrical transformation. For example, the electronic device 102 (e.g., processor 112, image obtainer 114, stitching scheme selector 118, etc.) may transform one or more curved overlapping regions of the wide-angle images into rectangular images (e.g., regions) using a geometrical transformation.

In some configurations, the processor 112 (e.g., stitching scheme selector 118, content analyzer 120, etc.) may determine one or more sub-regions of the rectangular images based on the content measure(s). Sub-regions may be an example of the image areas described above. For instance, the content analyzer 120 may divide (e.g., partition) the rectangular images into sub-regions that contain motion, nearby object(s), and/or one or more object(s) that cover a portion of the rectangular image. In some approaches, one or more portions with an amount of motion, an amount of disparity, and/or an amount of object coverage may be separated from one or more other areas. In some approaches, the rectangular image(s) (e.g., transformed overlapping region(s)) may be partitioned along one or more straight lines. For example, the rectangular images may be partitioned horizontally and/or vertically (across the span of the rectangular image, for instance). Additionally or alternatively, the rectangular image(s) (e.g., transformed overlapping region(s)) may be partitioned along a seam that may be linear and/or curved (e.g., meandering). A stitching scheme may be selected for each of the sub-regions. For example, different stitching schemes may be selected for two or more sub-regions in some cases.

In some configurations (where a region transform is performed, for example), the electronic device 102 (e.g., processor 112, image obtainer 114, stitching scheme selector 118, image stitcher 122, etc.) may determine a mapping between the images (e.g., input images, wide-angle images, normal images, telephoto images, etc.) and the transformed region(s). The content analysis, stitching scheme selection, feature mapping, seam determination, and/or area determination (e.g., sub-region determination) may be carried out based on the transformed images (e.g., transformed overlapping regions). The mapping may indicate a correspondence between the transformed images and the original images (and/or the equi-rectangular domain). The image stitcher 122 may utilize the mapping to apply the selected stitching scheme(s) to the images (in the equi-rectangular domain, for example).

The processor 112 may include and/or implement an image stitcher 122. The image stitcher 122 may stitch (e.g., combine, fuse, stitch, etc.) images to form a stitched image. For example, the image stitcher 122 may replace image data from one image (e.g., a first wide-angle image) with image data from another image (e.g., a second wide-angle image) and/or may combine image data from multiple images to produce the stitched image. For instance, the image stitcher 122 may stitch two or more images (e.g., telephoto images, normal images, wide-angle images, and/or fisheye images, etc.) to produce a surround view image (e.g., a 360-degree canvas) of a scene. The surround view image may provide a surrounding view (e.g., a 360-degree view in azimuth and/or elevation, a spherical view, etc.) relative to an observation point.

The image stitcher 122 may stitch the images based on one or more selected stitching schemes 124. For example, the image stitcher 122 may stitch the images in accordance with the one or more stitching schemes 124 selected by the stitching scheme selector 118. In some approaches, the image stitcher 122 may utilize multiple stitching schemes 124, each for stitching one or more areas (e.g., an area of an overlapping region, a partitioned area, a sub-region, etc.) of the images. Examples of stitching schemes 124 may include static seam-based stitching, dynamic seam-based stitching, and dynamic warp-based stitching. In some approaches, the image stitcher 122 may perform color correction (e.g., gamma-based color correction using a disparity measure or map). For example, the image stitcher 122 may perform color correction based on the disparity measure to remove one or more nearby objects, which may only be visible in one of the images (e.g., cameras), while computing a correction map.

In some configurations, the image stitcher 122 may be implemented in one or more blocks. For example, the image stitcher 122 may be implemented in one or more blocks (e.g., circuitries) included in and/or separate from the processor 112. For instance, different stitching schemes 124 may be implemented in and/or performed by different blocks. In some configurations, static seam-based stitching may be implemented on and/or performed by the processor 112, while dynamic warp-based stitching may be implemented on and/or performed by a graphics processing unit (GPU). In some configurations, all stitching schemes 124 may be implemented in hardware separate from the processor 112. For example, the processor 112 may not include the image stitcher 122, and the image stitcher 122 may be implemented in a different block (e.g., dedicated hardware, GPU, etc.) in the electronic device 102.

It should be noted that one or more of the elements or components of the electronic device 102 may be combined and/or divided. For example, one or more of the image obtainer 114, the stitching scheme selector 118, the content analyzer 120, the image stitcher 122, and/or the stitching scheme(s) 124 may be combined. Additionally or alternatively, one or more of the image obtainer 114, the stitching scheme selector 118, the content analyzer 120, the image stitcher 122, and/or the stitching scheme(s) 124 may be divided into elements or components that perform a subset of the operations thereof.

Figure 2:
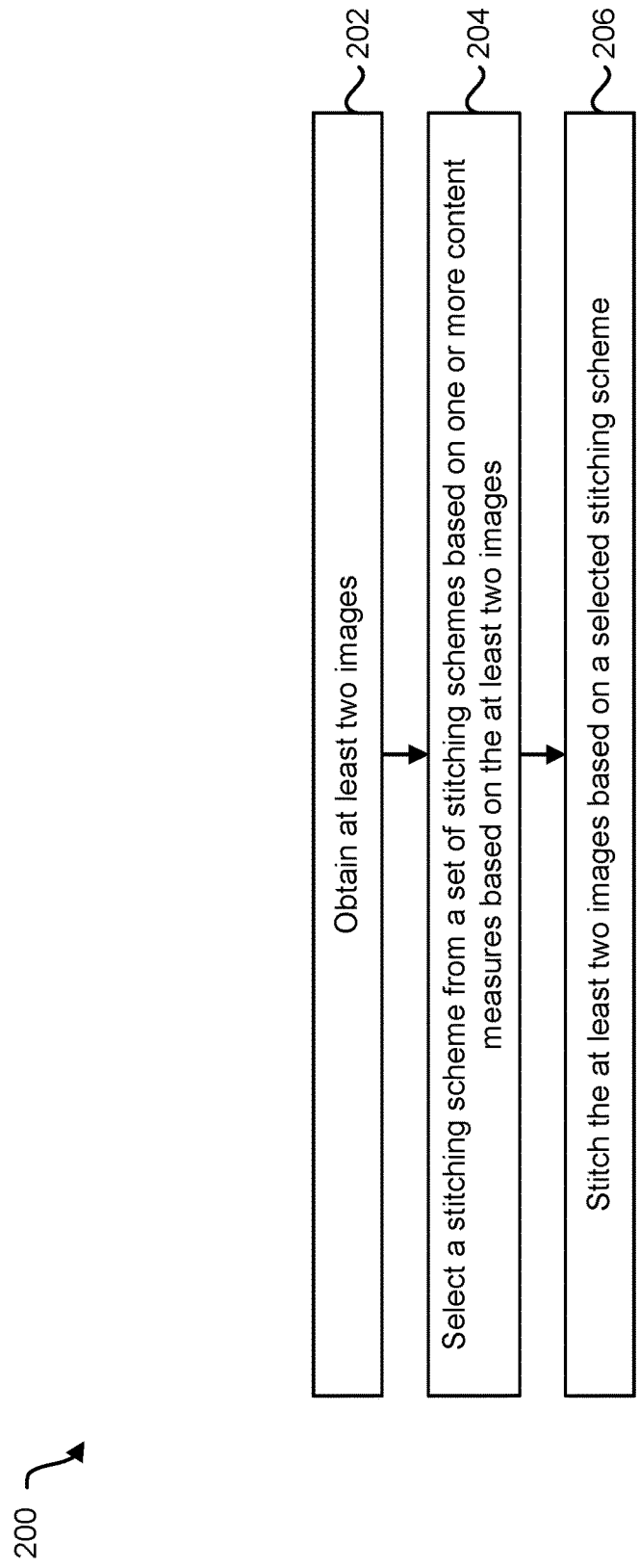
FIG. 2 is a flow diagram illustrating one configuration of a method for content-adaptive image stitching.

FIG. 2 is a flow diagram illustrating one configuration of a method 200 for content-adaptive image stitching. The method 200 may be performed by the electronic device 102, for example. The electronic device 102 may obtain 202 at least two images. This may be accomplished as described in relation to FIG. 1. For example, the electronic device 102 may capture wide-angle images (with multiple wide-angle lenses, for instance) or may receive wide-angle images from another device.

The electronic device 102 may select 204 a stitching scheme from a set of stitching schemes based on one or more content measures based on the at least two images. This may be accomplished as described in relation to FIG. 1. Selecting 204 a stitching scheme may be based on the content of the image(s). For example, the electronic device 102 may utilize one or more content measures (e.g., a motion measure, a disparity measure, and/or a coverage measure) to select a stitching scheme. In some configurations, the electronic device 102 may select one or more stitching schemes for one or areas (e.g., sub-regions) of the image(s).

The electronic device 102 may stitch 206 the at least two images based on a selected stitching scheme. This may be accomplished as described in relation to FIG. 1. For example, the electronic device 102 may perform image stitching (e.g., image fusion, combining, compositing, etc.) on the images with one or more selected stitching schemes.

Figure 3:
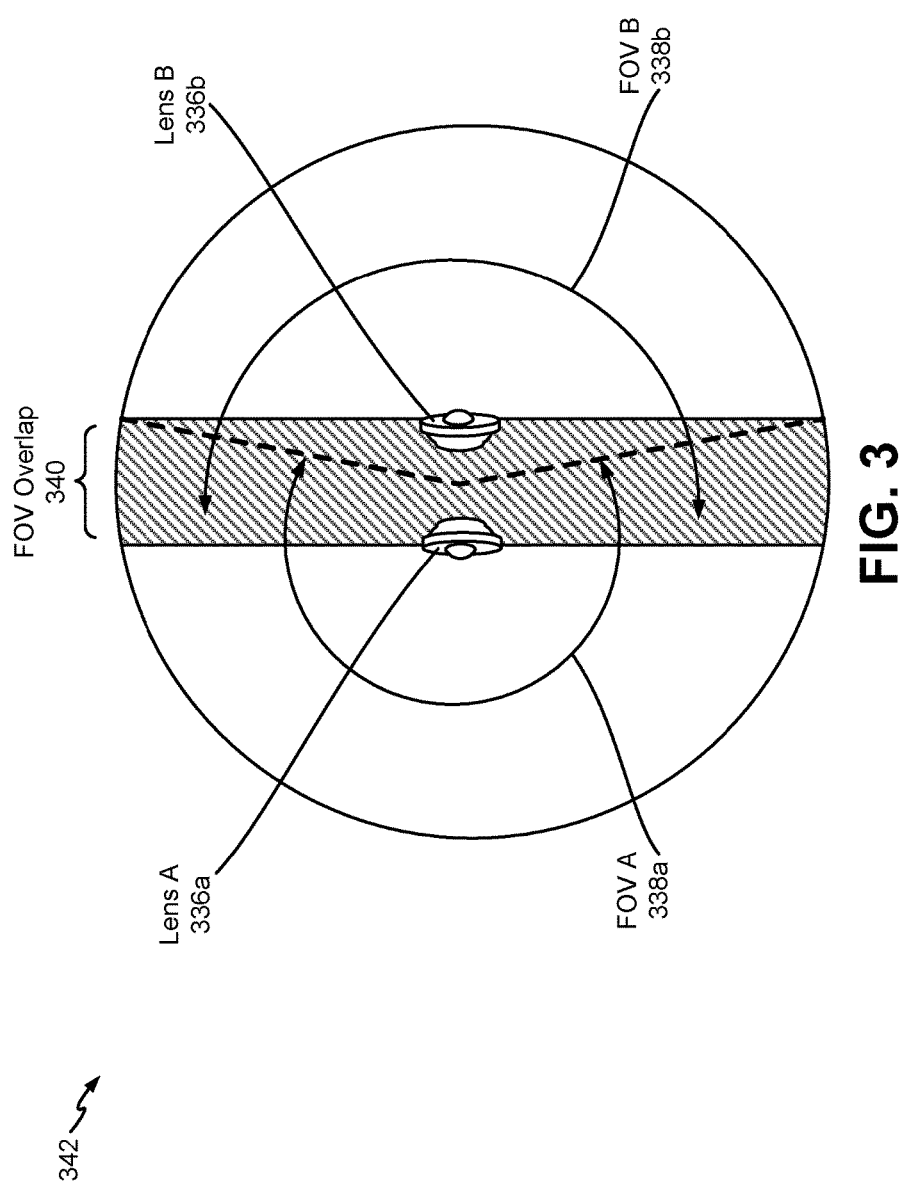
FIG. 3 is a diagram illustrating an example of dual fisheye lenses.

FIG. 3 is a diagram illustrating an example 342 of dual fisheye lenses 336*a-b*. In particular, FIG. 3 illustrates a dual fisheye arrangement that may be implemented in some configurations of the systems and methods disclosed herein. In this example, fisheye lens A 336*a* and fisheye lens B 336*b* face approximately opposite directions. Fisheye lens A 336*a* has FOV A 338*a* and fisheye lens B 336*b* has FOV B. As can be observed, the fisheye lenses 336*a-b* may have FOVs 338*a-b* that are greater than 180 degrees. The FOVs 338*a-b* may have a FOV overlap 340 that allows capture of overlapping images.

Figure 4:
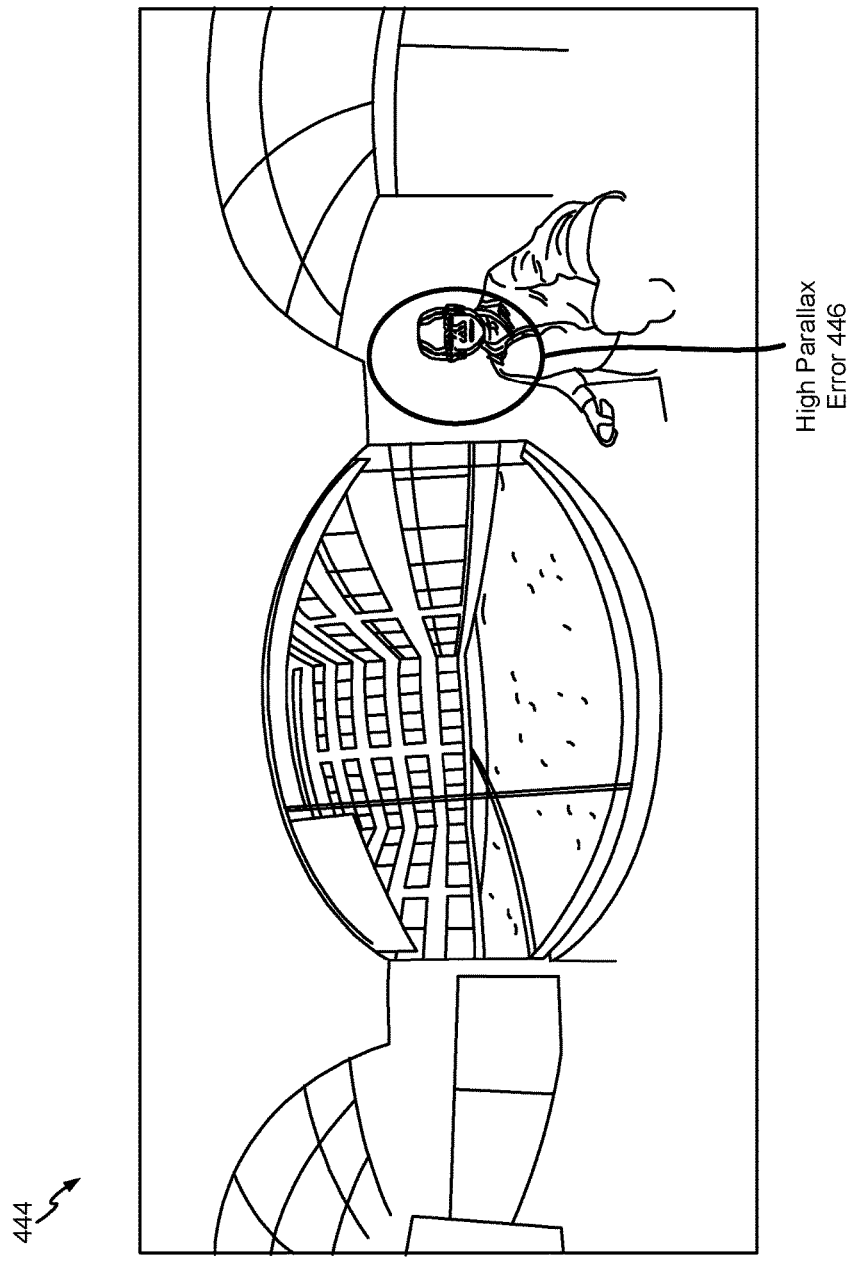
FIG. 4 illustrates an example of high parallax error.

FIG. 4 illustrates an example 444 of high parallax error 446. In particular, FIG. 4 illustrates an average image of dual fisheye camera inputs in the equi-rectangular domain. As shown in FIG. 4, high parallax error 446 may occur in the overlapping region between images from different fisheye cameras. Specifically, high parallax error 446 occurs due to the subject being close to the camera. For instance, there is a greater disparity in the position of the subject between cameras due to the closeness of the subject. It may also be observed that the background does not exhibit as much disparity. The systems and methods disclosed herein may beneficially avoid parallax errors by selecting an appropriate stitching scheme.

Figure 5:
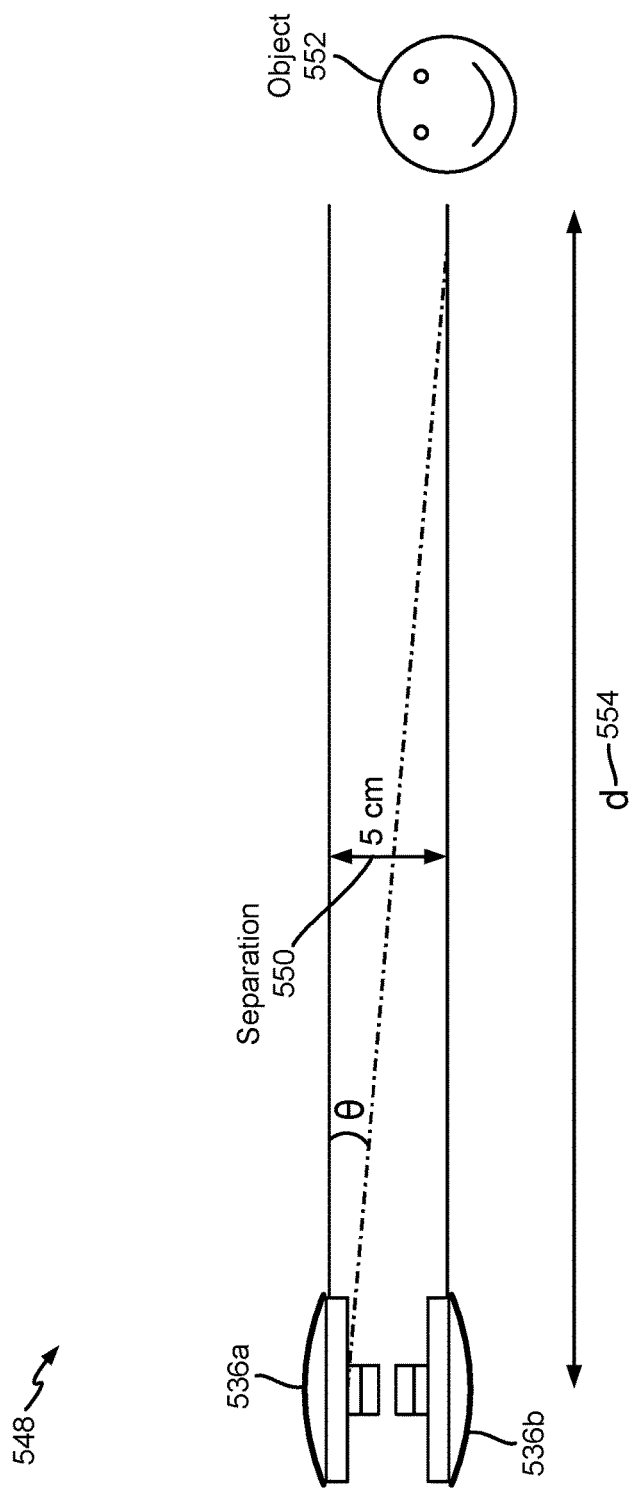
FIG. 5 is a diagram illustrating an example of parallax computation.

FIG. 5 is a diagram illustrating an example 548 of parallax computation. Parallax may occur because the same object 552 may appear at different image locations in different cameras due to an optical center difference. In particular, a pair of lenses 536*a-b* may have optical centers that are separated by an amount of separation 550. In the example 548 in FIG. 5, the separation 550 is 5 centimeters (cm). An object 552 may be positioned at a distance d 554 from the lens center. Lens B 536*b* may observe the object 552 at 180 degrees, while lens A 536*a* may observe the object 552 at 180 degrees plus θ. Equations (1)-(3) illustrate some relationships that may be utilized in parallax computation.

$$\tan\theta = \frac{5}{d} \tag{1}$$

$$R = f * \theta; f = 730 \text{ pixels} \tag{2}$$

$$\Delta_r = 730 * \tan^{-1}\left(\frac{5}{d}\right) \tag{3}$$

In Equations (1)-(3), θ is an angle relative to a lens plane, R is a distance from an image center (where an object appears, for example), f is a focal length, $\Delta_r$ is a parallax error (in pixels for example), and d is a distance between the lens center (e.g., lens center axis) and the object. The parallax error may indicate a distance in pixels between to positions of the object in each image. It should be noted that although a focal length f=730 pixels is used in this example, different values may be used (for different lenses with different focal lengths, for instance). It should also be noted that other separation distances other than 5 cm may be implemented. Table (1) illustrates some examples of parallax error.

TABLE 1

| Camera Separation | Object Distance | Parallax Error |
|---|---|---|
| 5 cm | 36 meters (m) | 1 pixel |
| 5 cm | 1 m | 36 pixels |
| 1 cm | 7.2 m | 1 pixel |

Figure 6:
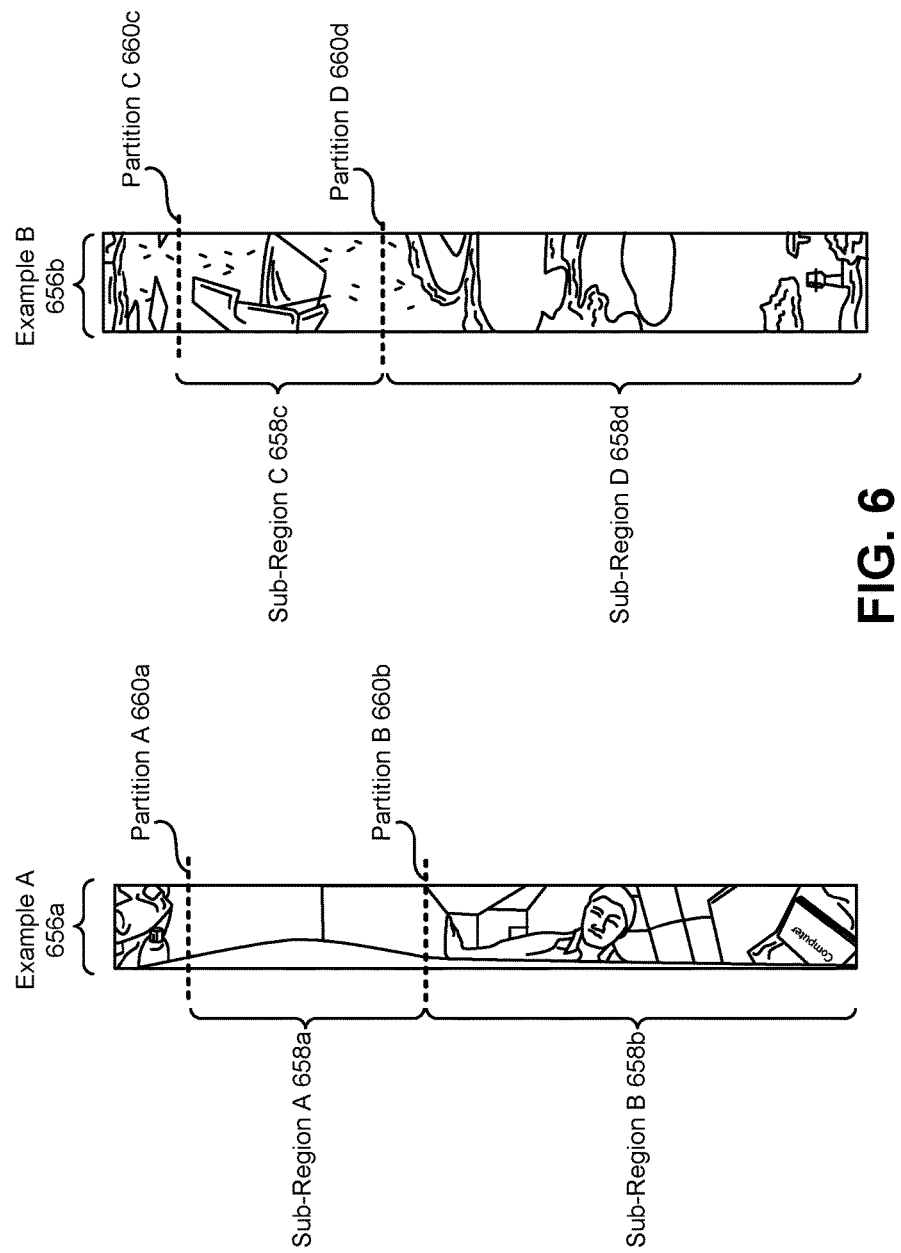
FIG. 6 is a diagram illustrating examples of content-adaptive selection of stitching schemes.

FIG. 6 is a diagram illustrating examples 656*a-b* of content-adaptive selection of stitching schemes. Each of the examples 656*a-b* represents an overlapping region between images. In some approaches, each of the examples 656*a-b* may illustrate overlapping regions that have been transformed from a curved overlapping region to a rectangular image using a geometrical transformation.

As described herein, an overlapping region may be partitioned into areas (e.g., sub-regions). For example, an overlapping region may be partitioned based on content (e.g., content measure(s), motion measure, disparity measure, etc.). In example A 656*a*, the overlapping region has been partitioned with partition A 660*a* and partition B 660*b* into sub-region A 658*a* and sub-region B 658*b*.

In sub-region A 658*a*, there are very few matching points (e.g., point features, keypoints, corners, etc.). Matching points may be needed to perform dynamic warp-based stitching. Because there are very few matching points in sub-region A 658*a*, dynamic warp-based stitching may not be performed. Instead, seam-based stitching (e.g., dynamic seam-based stitching) may be selected and/or performed for sub-region A 658*a* in accordance with some configurations of the systems and methods disclosed herein.

In sub-region B 658*b*, objects (e.g., a person's face and a book) are close to the cameras. Accordingly, disparity between the images (e.g., a disparity measure) may be high. Dynamic warp-based stitching may be selected and/or performed for sub-region B 658*b* in accordance with some configurations of the systems and methods disclosed herein.

In example B 656*b*, the overlapping region has been partitioned with partition C 660*c* and partition D 660*d* into sub-region C 658*c* and sub-region D 658*d*. In sub-region C 658*c*, objects are close to the cameras. Accordingly, disparity between the images (e.g., a disparity measure) may be high. Dynamic warp-based stitching may be selected and/or performed for sub-region C 658*c* in accordance with some configurations of the systems and methods disclosed herein.

In sub-region D 658*d*, objects are distant (e.g., far) from the cameras. Matching points may be needed to perform dynamic warp-based stitching. Accordingly, disparity between the images (e.g., a disparity measure) may be low. Dynamic seam-based stitching may be selected and/or performed for sub-region D 658*d* in accordance with some configurations of the systems and methods disclosed herein. Dynamic seam-based stitching may bypass (e.g., circumvent, go around, etc.) small parallax regions.

Under large image and/or camera motion (e.g., a high motion measure), static seam-based stitching may be selected. Motion may mask the stitching errors due to parallax. For example, image blur during camera motion may not allow computation of reliable feature matches used for dynamic warp-based stitching. Flickering resulting from using a dynamic seam-based stitching scheme (for high motion areas, for example) may be more disturbing to the viewer compared to static seam stitching errors.

Figure 7:
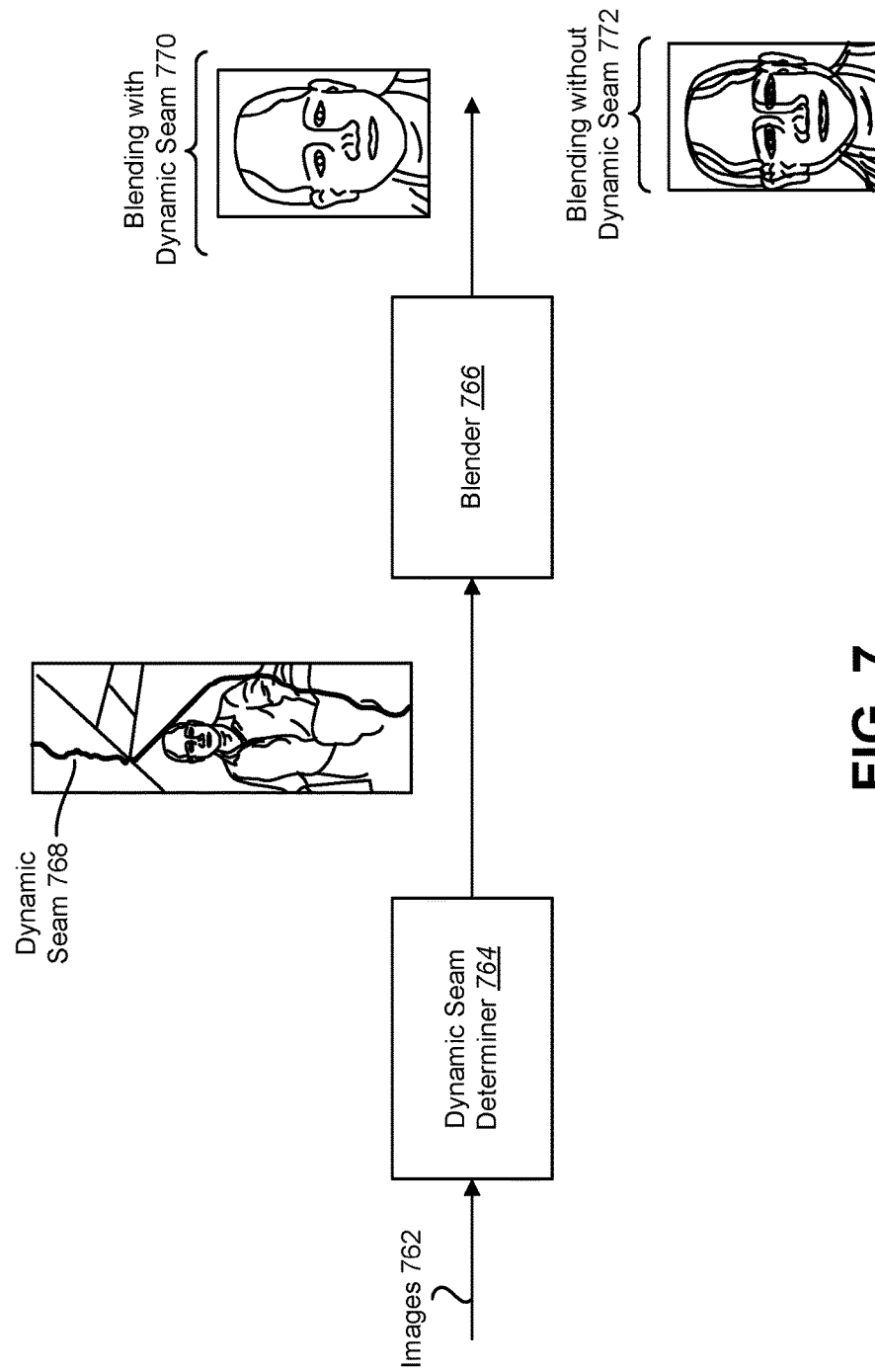
FIG. 7 is a block diagram illustrating an example of dynamic seam-based stitching.

FIG. 7 is a block diagram illustrating an example of dynamic seam-based stitching. In particular, FIG. 7 illustrates an example of a dynamic seam determiner 764 and a blender 766. In some configurations, the dynamic seam determiner 764 and/or the blender 766 may be implemented in the electronic device 102 described in connection with FIG. 1. For example, the dynamic seam determiner 764 and/or the blender 766 may be implemented in the image stitcher 122 as a stitching scheme 124.

The dynamic seam determiner 764 may receive images 762 (e.g., wide-angle images, input fisheye images, normal images, telephoto images, and/or a combination thereof). In some configurations, the images 762 may include overlapping regions (e.g., only overlapping regions) of original images or entire images.

The dynamic seam determiner 764 may determine (e.g., compute) a seam between the images 762 (e.g., between the overlapping regions). The dynamic seam determiner 764 may determine a seam that avoids going (e.g., cutting, crossing, etc.) through foreground regions (e.g., objects in the foreground of an image). For example, the dynamic seam determiner 764 may reduce (e.g., minimize) a cost for a seam. More detail of an approach for dynamic seam determination is provided in connection with FIGS. 12-13. One example of a dynamic seam 768 is provided in FIG. 7. The dynamic seam 768 does not go through foreground image regions.

The blender 766 may blend the images 762 (e.g., the overlapping regions) based on the seam determined by the dynamic seam determiner 764. For example, the blender 766 may perform alpha blending on the images 762 (e.g., overlapping regions) based on the dynamic seam. For instance, the blender 766 may blend (e.g., average, merge, sum, etc.) the images 762 in a blending region that borders the dynamic seam. One example of blending with a dynamic seam 770 is given in FIG. 7. For comparison, an example of blending without a dynamic seam 772 is also given in FIG. 7. As may be observed, utilizing dynamic seam-based stitching may avoid parallax errors in some cases by determining a seam (e.g., interface) between images that avoids foreground image regions.

Figure 8:
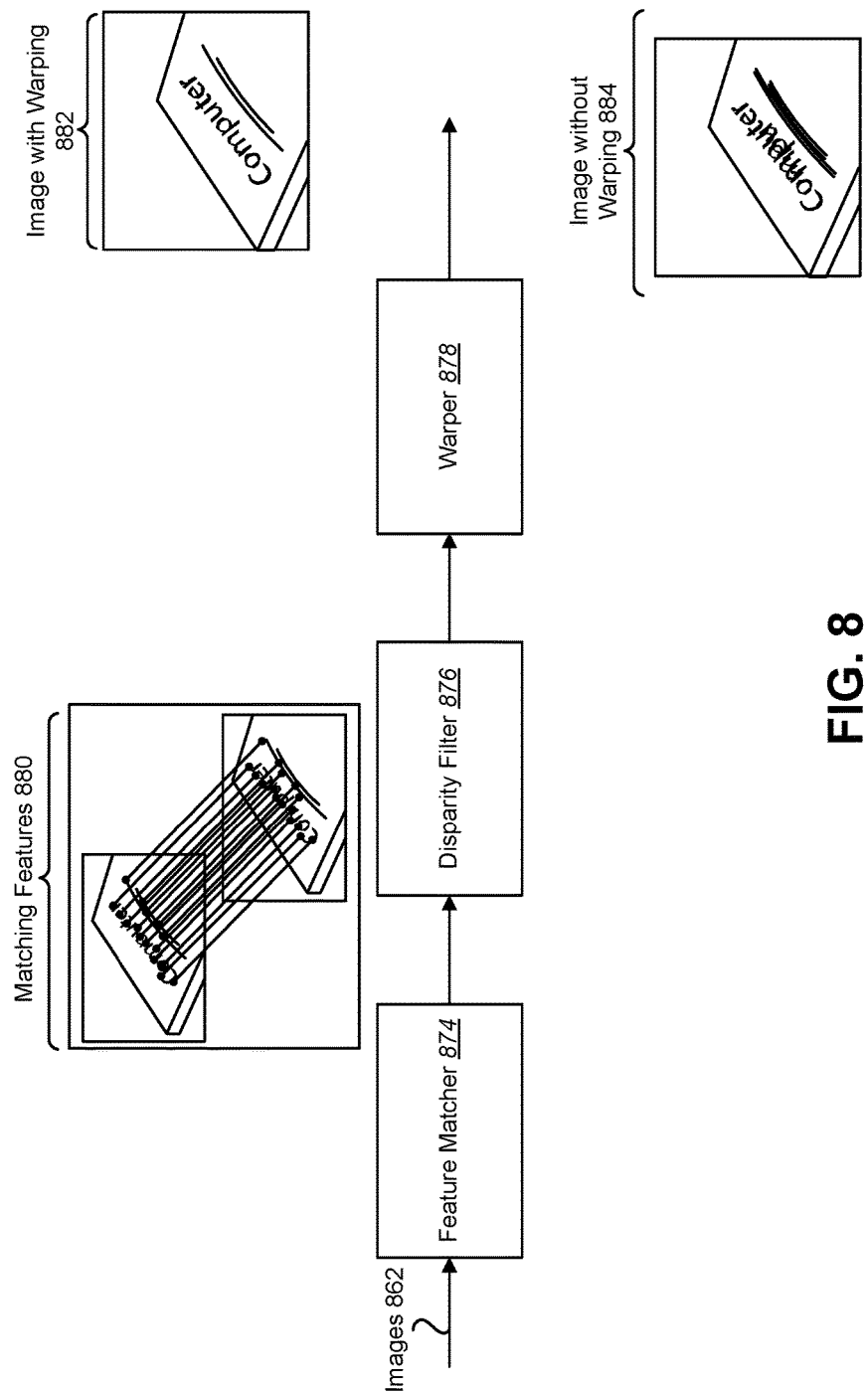
FIG. 8 is a block diagram illustrating an example of dynamic warp-based stitching.

FIG. 8 is a block diagram illustrating an example of dynamic warp-based stitching. In particular, FIG. 8 illustrates an example of a feature matcher 874, a disparity filter 876, and a warper 878. In some configurations, the feature matcher 874, the disparity filter 876, and/or the warper 878 may be implemented in the electronic device 102 described in connection with FIG. 1. For example, the feature matcher 874, a disparity filter 876, and/or a warper 878 may be implemented in the stitching scheme selector 118 and/or in the image stitcher 122 as a stitching scheme 124.

The feature matcher 874 may receive images 862 (e.g., wide-angle images, input fisheye images, normal images, telephoto images, and/or a combination thereof). In some configurations, the images 862 may include overlapping regions (e.g., only overlapping regions) of original images or entire images.

The feature matcher 874 may determine (e.g., compute) matching features 880 (e.g., corresponding features) of the images 862 (e.g., between the overlapping regions). For example, the feature matcher 874 may determine one or more matching features 880 (e.g., features, feature points, keypoints, corners, etc.) between the images. More detail of an approach for matching features is provided in connection with FIG. 14. One example of matching features 880 is provided in FIG. 8. In particular, the example of matching features 880 illustrates a correspondence between point features from different images.

The disparity filter 876 may perform disparity filtering. The disparity filter 876 may remove, eliminate, and/or not consider one or more disparity values that do not meet one or more criteria. For instance, one or more disparity values that indicate a shift in an incorrect direction may be eliminated or not considered. Additionally or alternatively, one or more disparity values that are too large (e.g., that are beyond a threshold or that would go beyond an overlapping region) may be eliminated or not considered. A more specific example of disparity filtering is given in connection with FIG. 17.

The warper 878 may warp one or more of the images 862 (e.g., the overlapping regions) based on the matching features determined by the feature matcher 874. For example, the warper 878 may warp (e.g., modify, stretch, squeeze, bend, etc.) one or more of the images 862 in order to align one or more of the matching features. In some configurations, the warper 878 may perform GPU-based warping. For example, the warper 878 may be implemented in a GPU and/or may control a GPU in order to perform warping of one or more of the images 862. One example of an image with warping 882 (e.g., a warped image) is given in FIG. 8. For comparison, an example of an image without warping 884 (e.g., a blended image without warping) is also given in FIG. 8. As may be observed, performing dynamic warp-based stitching may reduce parallax errors in some cases. In some approaches, warping may be performed based on a filtered disparity measure. For example, the disparity measure (e.g., disparity map) may indicate one or more distances for warping in order to align the images 862.

Figure 9:
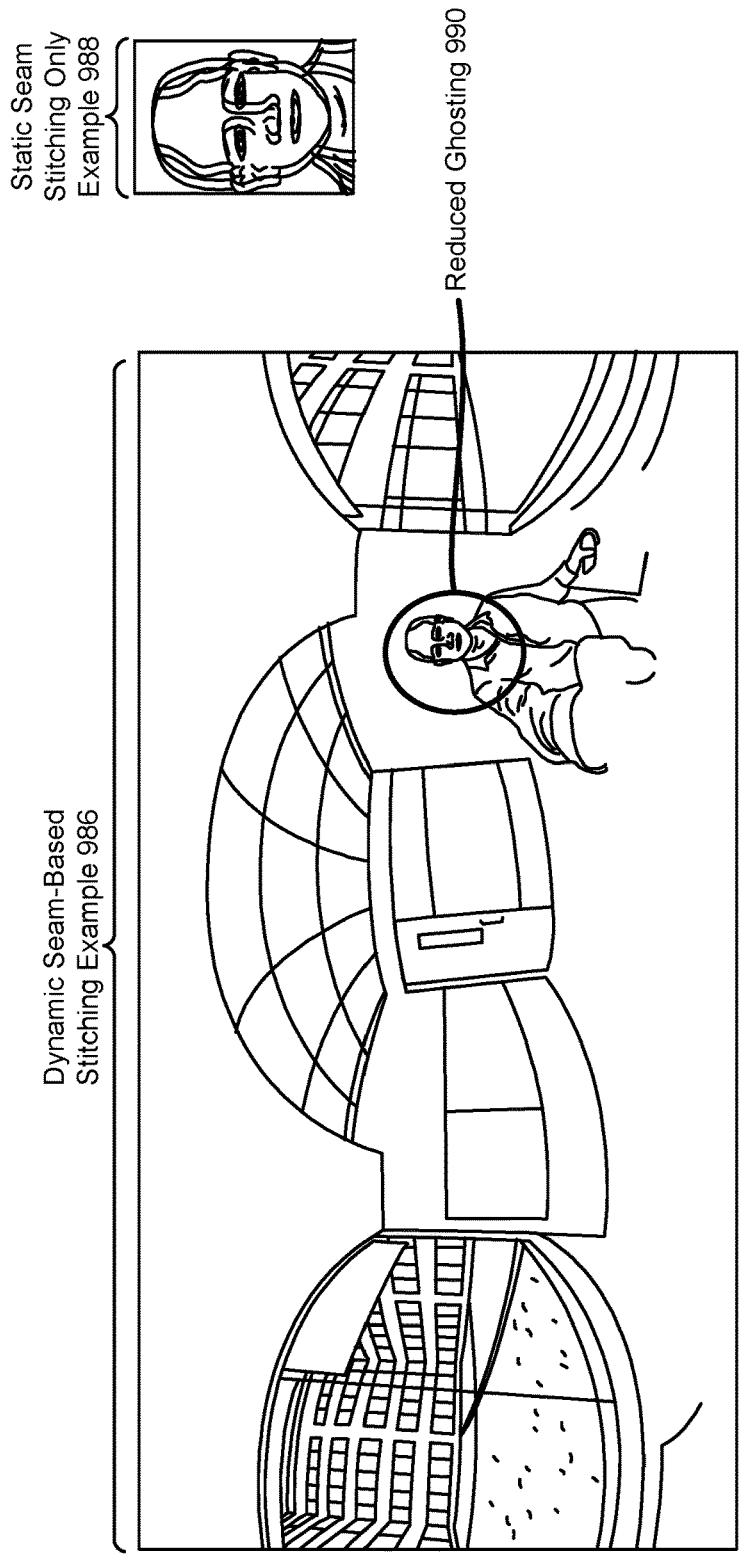
FIG. 9 illustrates a comparison of a dynamic seam stitched image example and a static seam stitched image example.

FIG. 9 illustrates a comparison of a dynamic seam stitched image example 986 and a static seam stitched image example 988. As illustrated by the static seam stitched image example 988, performing only static seam stitching may result in severe ghosting in some cases. The dynamic seam stitched image example 986 demonstrates reduced ghosting 990 because the dynamic seam has circumvented foreground image regions. Accordingly, static seam-based stitching may be beneficial in some cases and/or image areas (e.g., sub-regions), whereas dynamic seam-based stitching may be beneficial in some cases and/or image areas (e.g., sub-regions). Some configurations of the systems and methods disclosed herein may select static seam-based stitching, dynamic seam-based stitching, and/or one or more other stitching schemes for one or more image areas.

Figure 10:
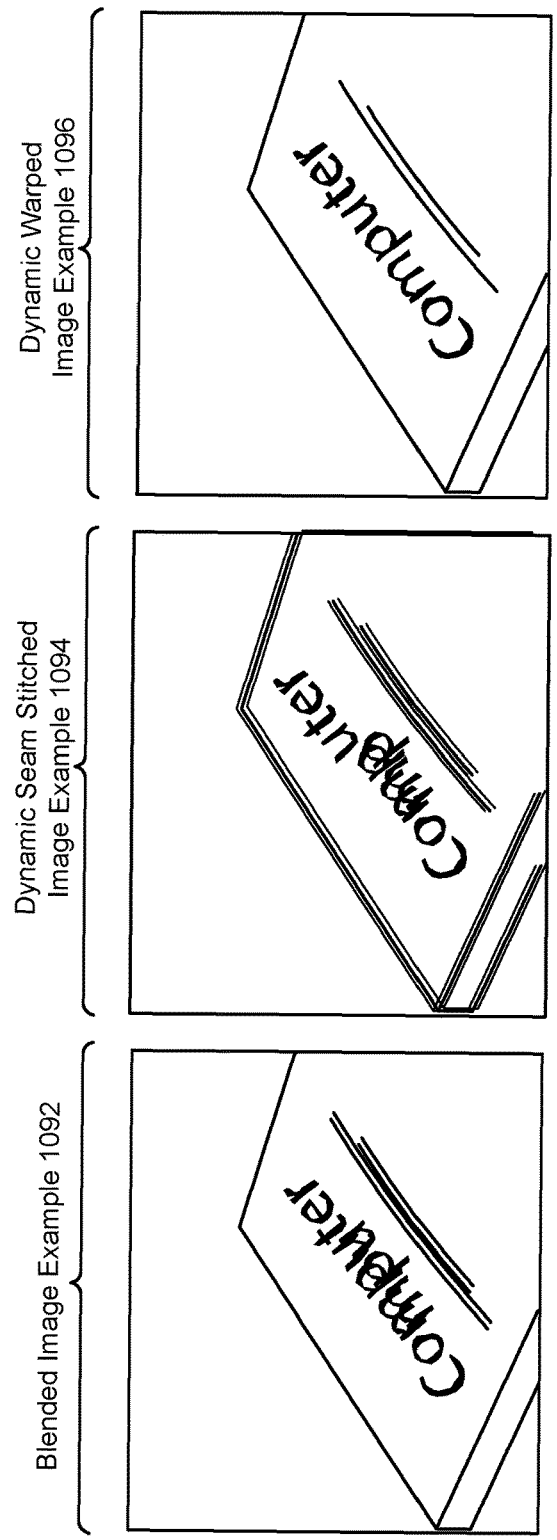
FIG. 10 illustrates a comparison of a blended image example, a dynamic seam stitched image example, and a dynamic warped image example.

FIG. 10 illustrates a comparison of a blended image example 1092, a dynamic seam stitched image example 1094, and a dynamic warped image example 1096. As illustrated by the dynamic seam stitched image example 1094 and the dynamic warped image example 1096, dynamic warp-based stitching may reproduce text better than dynamic seam-based stitching in some cases. Accordingly, dynamic seam-based stitching may be beneficial in some cases and/or image areas (e.g., sub-regions), whereas dynamic warp-based stitching may be beneficial in some cases and/or image areas (e.g., sub-regions). Some configurations of the systems and methods disclosed herein may select dynamic seam-based stitching, dynamic warp-based stitching and/or one or more other stitching schemes for one or more image areas.

Figure 11:
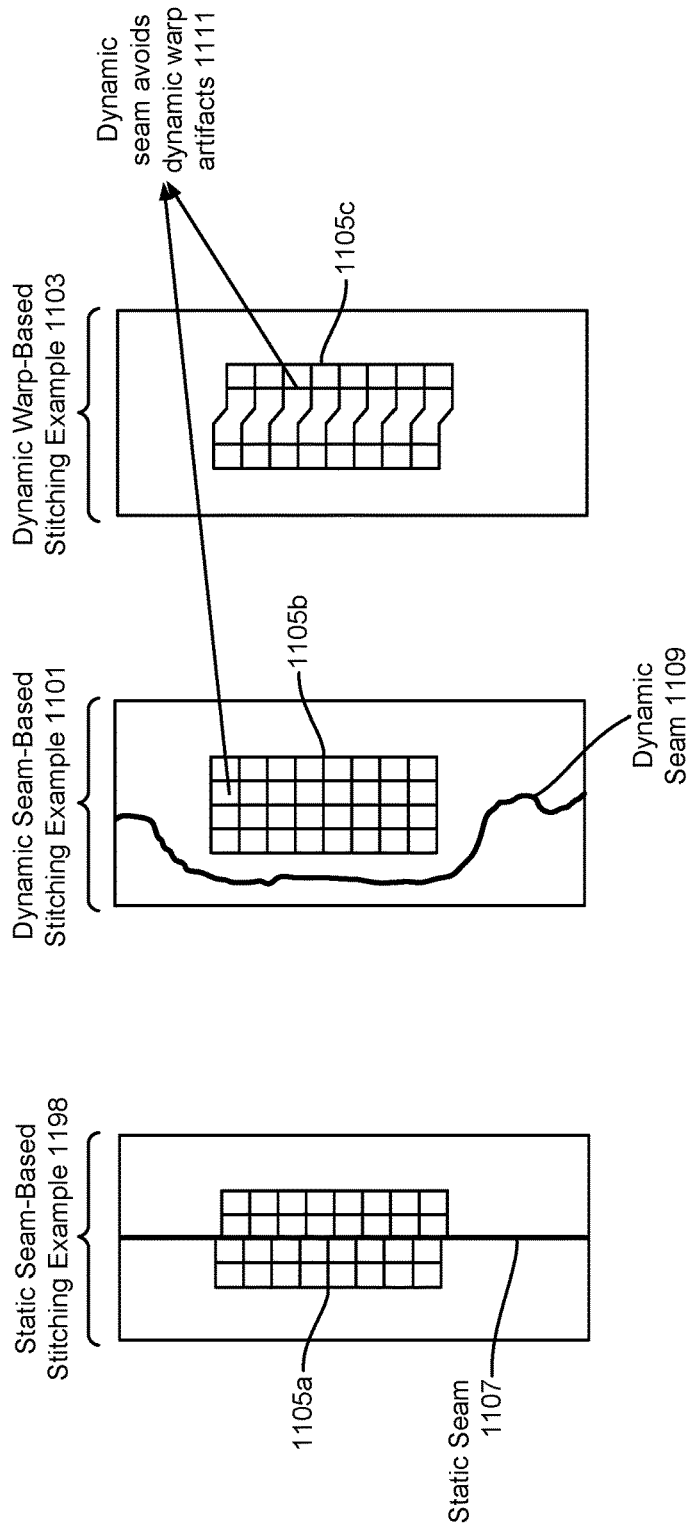
FIG. 11 is a diagram illustrating a static seam-based stitching example, a dynamic seam-based stitching example, and a dynamic warp-based stitching example.

FIG. 11 is a diagram illustrating a static seam-based stitching example 1198, a dynamic seam-based stitching example 1101, and a dynamic warp-based stitching example 1103. In particular, FIG. 11 illustrates a comparison between dynamic seam-based stitching and dynamic warp-based stitching.

In the static seam-based stitching example 1198, images are stitched with a static seam 1107 to produce a stitched image. A static seam 1107 may be a predetermined and/or unchanging seam between images. If the static seam 1107 crosses an object 1105a (e.g., a foreground object, a foreground region, etc.), an artifact (e.g., discontinuity) in the object 1105a may appear in the stitched image due to parallax.

In the dynamic seam-based stitching example 1101, images are stitched with a dynamic seam 1109 to produce a stitched image. A dynamic seam 1109 may be determined in order to avoid crossing an object 1105b (e.g., a foreground object, a foreground region, etc.). For example, the dynamic seam 1109 may be determined by reducing (e.g., minimizing) a cost. The cost may be high for some objects (e.g., foreground regions). Accordingly, the dynamic seam 1109 may avoid the object 1105b by bypassing (e.g., going around, etc.) the object 1105b.

In the dynamic warp-based stitching example 1103, images are stitched by warping one or more images to produce a stitched image. Warping the images may result in artifacts appearing in an object 1105c of the stitched image. In some cases, utilizing a dynamic seam may avoid dynamic warp artifacts 1111. Accordingly, the dynamic seam-based warping may perform better than dynamic warping in busy areas of the image and/or when the object is distant (e.g., far off).

Figure 12:
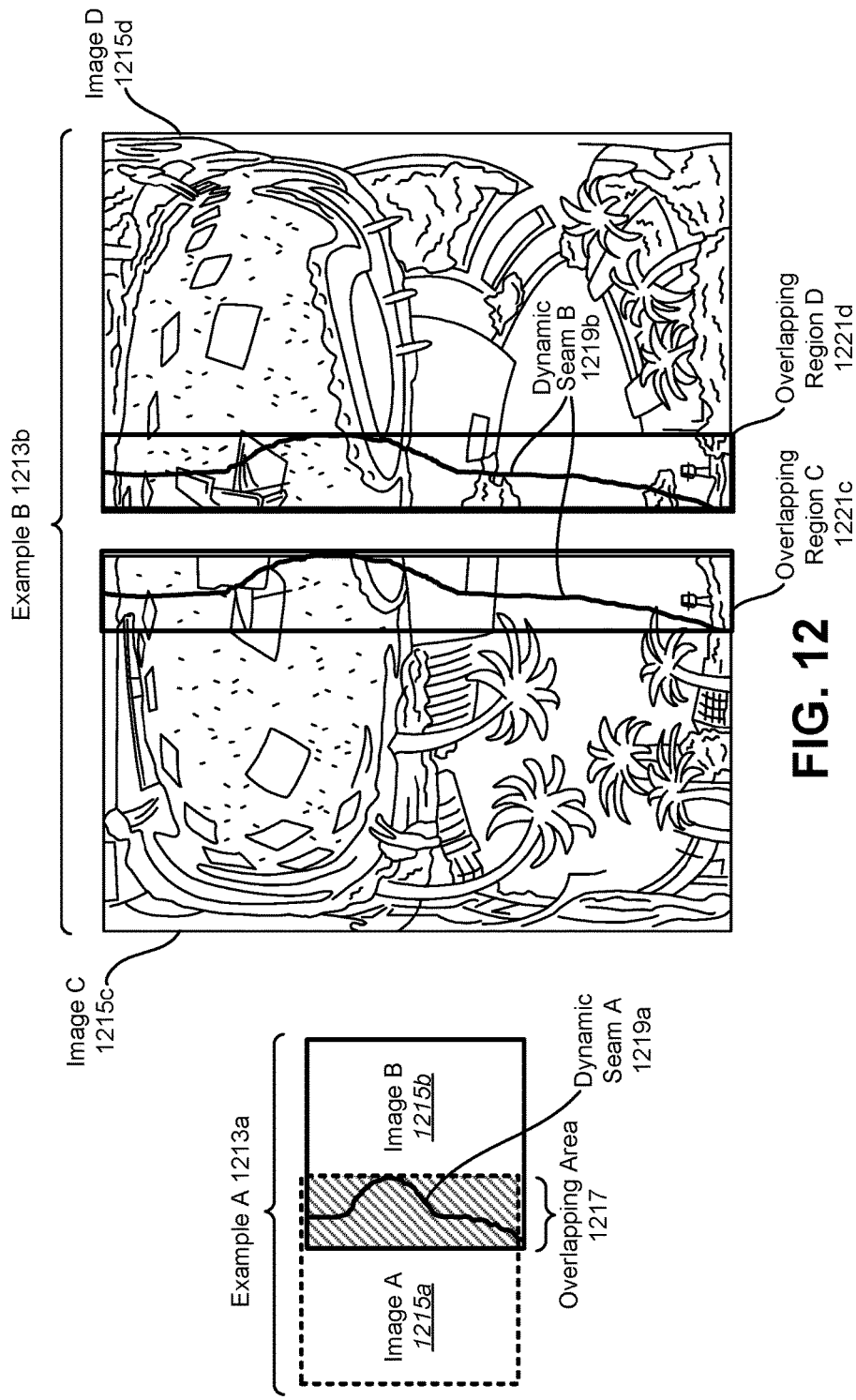
FIG. 12 is a diagram illustrating examples of dynamic seam-based stitching.

FIG. 12 is a diagram illustrating examples 1213a-b of dynamic seam-based stitching. In particular, example A 1213a illustrates image A 1215a, image B 1215b, and an overlapping area 1217 between image A 1215a and image B 1215b. Example A 1213a also illustrates dynamic seam A 1219a. For instance, an electronic device may determine dynamic seam A 1219a, which may be pixels along which image A 1215a and image B 1215b may be stitched.

Example B 1213b illustrates image C 1215c, image D 1215d, and overlapping regions C-D 1221c-d between image C 1215c and image D 1215d. Example B 1213b also illustrates dynamic seam B 1219b. For instance, an electronic device may determine dynamic seam B 1219b. Seam pixels may be determined such that the seam does not pass through foreground image regions. For example, the seam may be computed by reducing (e.g., minimizing) a cost for the seam. It should be noted that image C 1215c and image D 1215d are transformed images. For instance, overlapping region C 1221c and overlapping region D 1221d may result from transforming curved overlapping regions of two curved overlapping regions of wide-angle (e.g., fisheye) images. In some configurations of the systems and methods disclosed herein, entire images (e.g., wide-angle images, fisheye images, etc.) may be transformed or subsets thereof (e.g., overlapping regions). In example B 1213b, image C 1215c (e.g., overlapping region C 1221c) and image D 1215d (e.g., overlapping region D 1221d) may be transformed into rectangular images.

Figure 13:
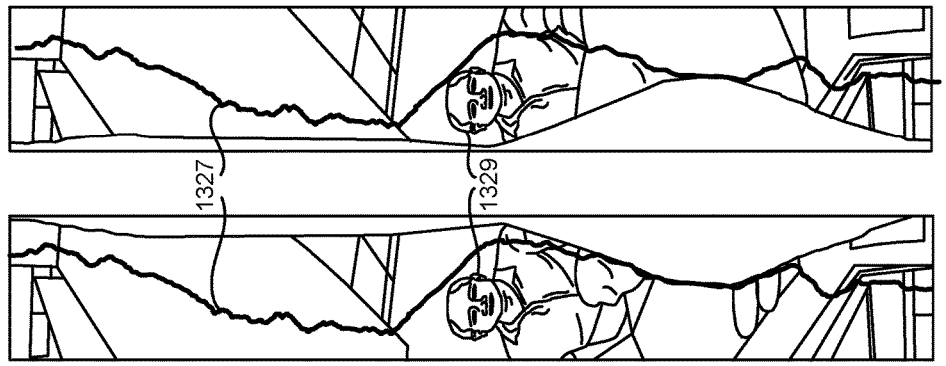
FIG. 13 is a diagram illustrating an example of a seam cost function for some approaches of dynamic-seam based stitching.
Figure 13:
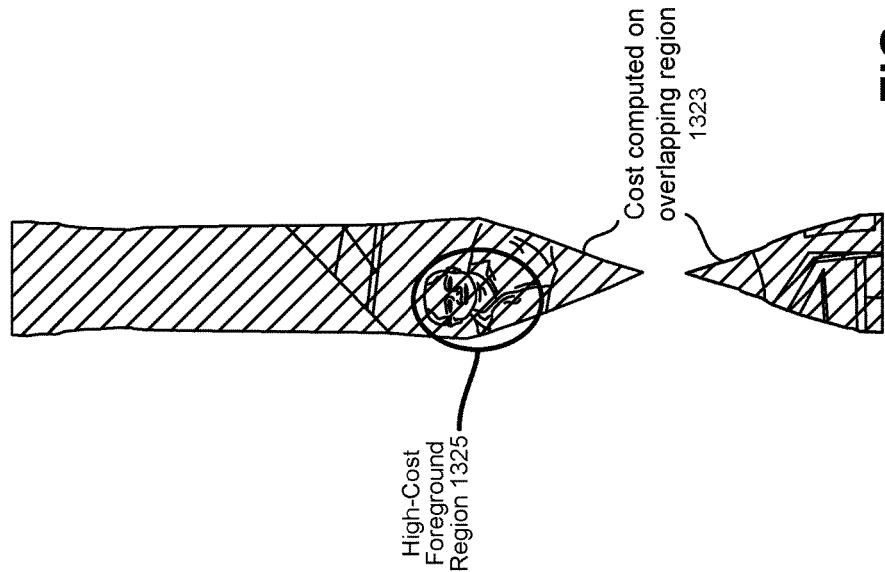

FIG. 13 is a diagram illustrating an example of a seam cost function for some approaches of dynamic-seam based stitching. In particular, FIG. 13 illustrates a cost computed on an overlapping region 1323. In this example, the cost computed on the overlapping region 1323 indicates a high-cost foreground region 1325. More specifically, the cost computed on the overlapping region 1323 may indicate a high cost for a seam to cross (e.g., to go through) foreground image regions.

In FIG. 13, the seam based on the cost function is overlaid on overlapping images 1327 (e.g., transformed images). As illustrated, the seam does not cross (e.g., go through) the foreground image regions 1329 due to the cost. A seam determined in accordance with a cost function may be utilized for dynamic seam-based stitching in some configurations of the systems and methods disclosed herein.

Figure 14:
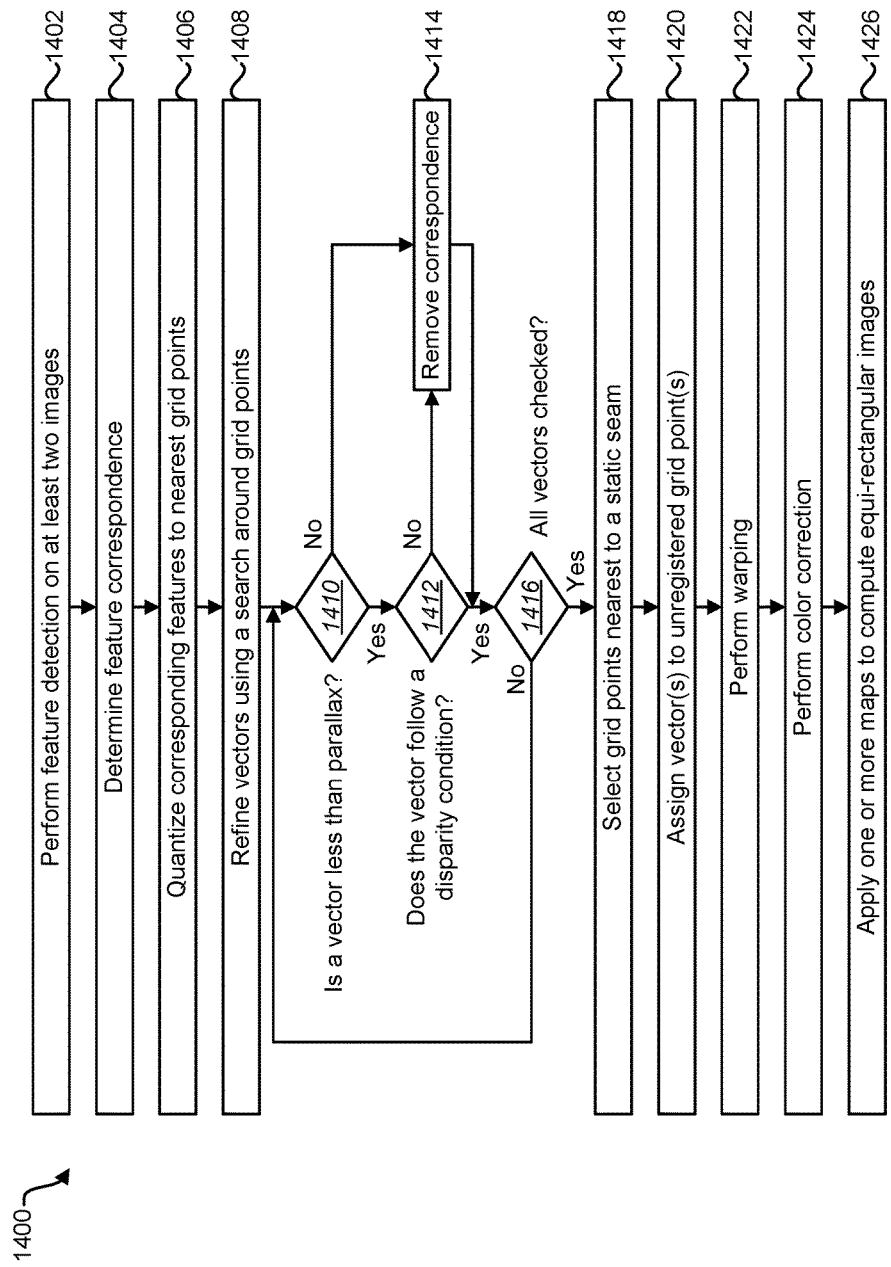
FIG. 14 is a flow diagram illustrating one configuration of a method for dynamic warp-based stitching.

FIG. 14 is a flow diagram illustrating one configuration of a method 1400 for dynamic warp-based stitching. The method 1400 may be performed by the electronic device 102, for example. In some configurations, the method 1400 may be performed in order to stitch two or more images when dynamic warp-based stitching is selected as described herein.

The electronic device 102 may perform 1402 feature detection on at least two images. This may be accomplished as described in relation to FIG. 1. For example, the electronic device 102 may detect one or more features (e.g., corners, keypoints, etc.) in two or more images. The images may be entire images or subsets (e.g., areas, regions, etc.) of images. In some configurations, feature detection may be performed on transformed images (e.g., rectangular images obtained by transforming curved overlapping regions in wide-angle images).

The electronic device 102 may determine 1404 feature correspondence (e.g., matching features, corner correspondence, etc.). For example, the electronic device 102 may determine whether a feature in one image (e.g., a first image) corresponds to a feature of another image (e.g., a second image). In some approaches, the electronic device 102 may perform a sum of absolute differences (SAD)-based corner correspondence using forward and/or backward matching. For example, the electronic device 102 may calculate a SAD measure between the first image and the second image. The SAD measure may indicate corresponding features with forward and/or backward matching.

The electronic device 102 may quantize 1406 corresponding features (e.g., matching features, matched corners, etc.) to nearest grid points. For example, the electronic device 102 may associate one or more features to grid points. The grid may be predetermined and/or may be determined by the electronic device 102. For instance, the grid may be a uniform or non-uniform grid that corresponds to (e.g., is overlaid on) the image. Each of the corresponding features (e.g., matching features, matching corners, etc.) may be associated with (e.g., assigned to, shifted to, etc.) respective nearest grid points.

The electronic device 102 may refine 1408 vectors using a search around grid points. For example, each pair of corresponding features (e.g., matching features, matching corners, matching keypoints, etc.) may have an associated vector (e.g., a "motion" vector (MV)) that indicates the displacement between the features. The electronic device 102 may refine 1408 each of the vectors. In some configurations, the electronic device 102 may refine the vectors (e.g., MVs) using a sum of absolute differences (SAD) search around grid points. For example, the disparities computed using corner matching may be used to seed the SAD-based search procedure. The outputs of the SAD search may be the refined disparity vectors.

The electronic device 102 may determine 1410 whether a vector is less than parallax (e.g., a parallax error). In some configurations, this may be performed for each of the vectors. For example, the electronic device 102 may determine whether each vector has a length value (in pixels, for example) that is less than a parallax value. If the vector is not less than parallax (e.g., is greater than or equal to parallax), the electronic device 102 may remove 1414 the correspondence (e.g., match). For example, the electronic device 102 may discard the correspondence (e.g., match) between the features if the associated vector is not less than parallax.

If the vector is less than parallax, the electronic device 102 may determine 1412 whether the vector follows a disparity condition (e.g., one or more disparity criteria for disparity filtering). In some configurations, this may be performed for each of the vectors. For example, if a vector indicates an incorrect direction and/or is too large, the vector may not meet the disparity condition as described herein. If the vector does not follow the disparity condition, the electronic device 102 may remove 1414 the correspondence (e.g., match). For example, the electronic device 102 may discard the correspondence (e.g., match) between the features if the associated vector does not follow the disparity condition.

As illustrated in FIG. 14, determining 1410 whether a vector is less than parallax and/or determining 1412 whether the vector follows a disparity condition may be performed for each vector in some configurations. For example, the electronic device 102 may determine 1416 whether all of the vectors have been checked in some approaches. If not all of the vectors have been checked, the electronic device 102 may return to determine 1410 whether a vector (e.g., a next vector) is less than parallax and/or to determine 1412 whether the vector follows a disparity condition. Accordingly, the electronic device 102 may determine (e.g., produce) a set of vectors (e.g., grid MVs) for the images.

If all of the vectors have been checked, the electronic device 102 may select 1418 one or more grid points nearest to a static seam. For example, the electronic device 102 may select one or more grid points that are closest to a static seam (e.g., a predetermined static seam). For instance, the electronic device 102 may select grid points within a threshold distance from the static seam, a proportion of grid points that are closest to the static seam, one or more sets (e.g., columns, rows, etc.) of grid points that are nearest to the static seam, etc.

The electronic device 102 may assign 1420 one or more vectors to one or more unregistered grid points. For example, the electronic device 102 may determine and/or assign vectors (e.g., MVs) to one or more grid points without corresponding vector(s) from feature points. In some approaches, the electronic device 102 may perform a search (e.g., a SAD-based search) within a blending region. The electronic device 102 may also linearly decay the vector (e.g., MV) to 0 along a dimension (e.g., width, width of a blending region, etc.).

The electronic device 102 may perform 1422 warping. For example, the electronic device 102 may warp (e.g., shift, stretch, bend, flex, etc.) the images in order to align the images (e.g., align features of the images). In some configurations, the warping may be graphics processing unit (GPU)-based warping. For instance, the electronic device 102 may utilize a GPU to perform 1422 the warping.

The electronic device 102 may perform 1424 color correction. For example, the electronic device 102 may alter the color of one or more of the images in order to match the color between the images. In some configurations, the color correction may be gamma-based color correction. In some approaches, performing 1424 color correction may be based on the disparity measure. For example, if the disparity measure indicates that a nearby object appears in the one or more of the images (e.g., sub-regions of the rectangular images), the electronic device 102 may ignore the area(s) (e.g., set of pixels, rows and/or columns, etc.) occupied by the objects in computing the color correction.

The electronic device 102 may optionally apply 1426 one or more maps to compute equi-rectangular images. For example, the electronic device 102 may determine and/or maintain one or more maps between original images (e.g., wide-angle images, overlapping regions of wide-angle images, etc.) and transformed images (e.g., rectangular images). The electronic device 102 may apply 1426 the map(s) in order to apply the warping and/or stitching to the original images. In some configurations, stitched image may be computed in the equi-rectangular domain. In approaches where a transformation is not utilized and/or implemented, the electronic device 102 may perform warping directly on the original image(s) (e.g., wide-angle images, etc.).

The electronic device 102 may output the stitched image (e.g., equi-rectangular image). For example, the electronic device 102 may store the stitched image and/or may transmit the stitched image.

Figure 15:
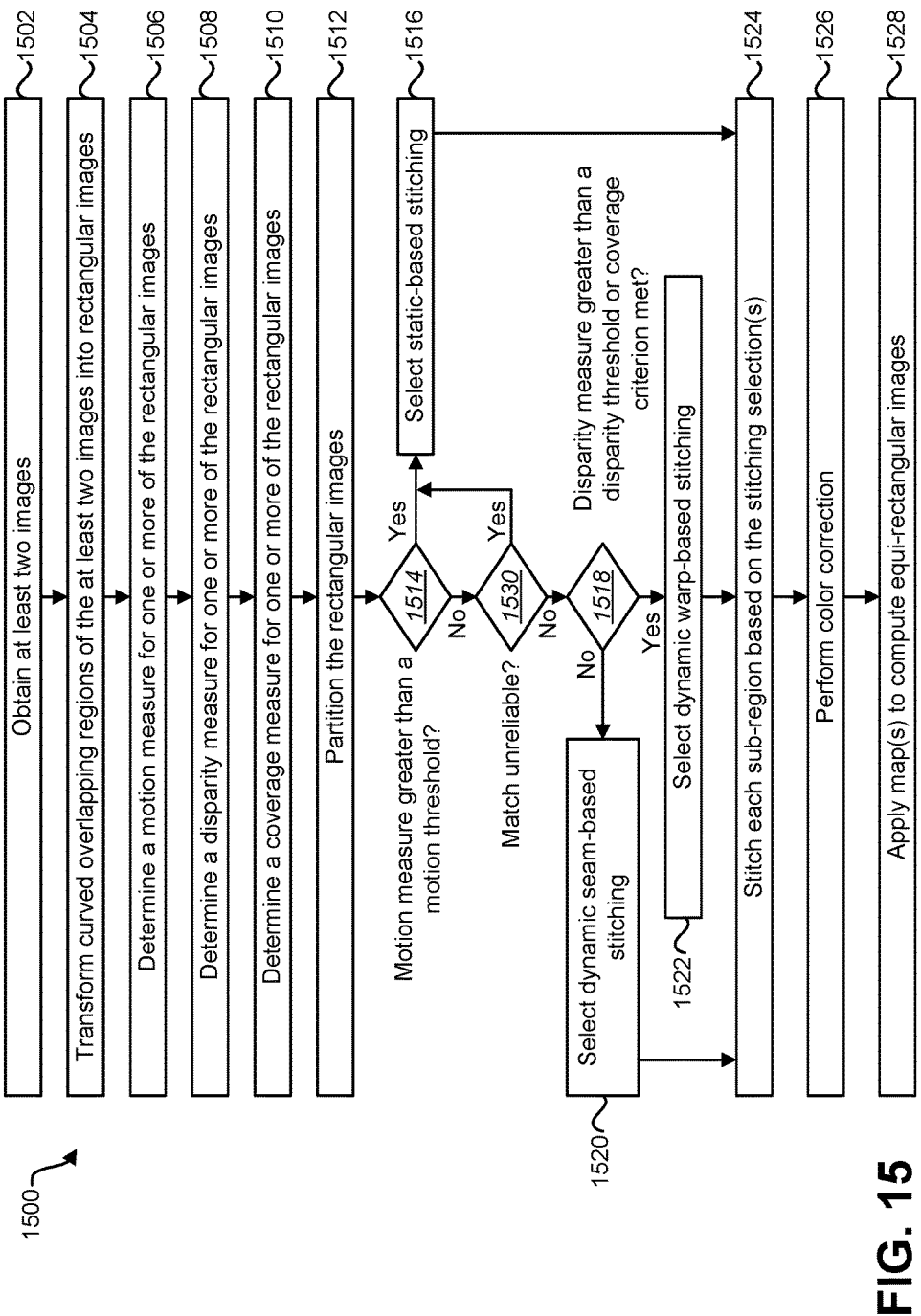
FIG. 15 is a flow diagram illustrating a more specific configuration of a method for content-adaptive image stitching.

FIG. 15 is a flow diagram illustrating a more specific configuration of a method 1500 for content-adaptive image stitching. The method 1500 may be performed by the electronic device 102, for example. The electronic device 102 may obtain 1502 at least two images. This may be accomplished as described in relation to one or more of FIGS. 1-2. For example, the electronic device 102 may capture one or more wide-angle images (e.g., fisheye camera images) and/or may receive one or more wide-angle images from another device. Each of the images may include at least one overlapping region. For example, overlapping regions may be located on the periphery of the images (e.g., within an outer ring in a wide-angle image).

The electronic device 102 may transform 1504 curved overlapping regions of the at least two images into rectangular images. This may be accomplished as described in relation to FIG. 1. For example, the electronic device 102 may transform 1504 the curved overlapping regions of the at least two images into rectangular images using a geometrical transformation. The rectangular images may be computed only in one or more overlapping regions of the images in some approaches. In some configurations, one or more overlapping regions may be determined during calibration.

For instance, the size and/or location of the overlapping region(s) may be determined using a procedure during calibration. Accordingly, the transformation may only be applied in the overlapping region(s). In some configurations, the rectangular images may be referred to as "pencil images."

The electronic device 102 may determine 1506 a motion measure for one or more of the rectangular images. This may be accomplished as described in connection with FIG. 1. For example, the electronic device 102 may compare a current image (e.g., current frame, current rectangular image, etc.) with a previous image (e.g., previous frame, previous rectangular image, etc.) to determine motion between the images (from different times, for instance).

The electronic device 102 may determine 1508 a disparity measure for one or more of the rectangular images. This may be accomplished as described in connection with FIG. 1. For example, the electronic device 102 may compare one of the rectangular images (e.g., a first rectangular image) with another rectangular image (e.g., a second rectangular image) to determine the disparity measure. In some approaches, the electronic device 102 may perform feature detection (e.g., corner detection, keypoint detection, etc.) in order to determine the disparity measure. Detected features may be compared between the rectangular images to determine vectors (e.g., distances) between the features. The vectors may be indicate and/or may be utilized to determine 1508 the disparity measure.

The electronic device 102 may determine 1510 a coverage measure for one or more of the rectangular images. This may be accomplished as described in connection with FIG. 1. For example, the electronic device 102 may determine a coverage of features (e.g., corners, keypoints, etc.) in one or more of the rectangular images.

The electronic device 102 may partition 1512 (e.g., adaptively partition) the rectangular images. This may be accomplished as described in connection with FIG. 1. For example, the electronic device 102 may designate (e.g., label, separate, distinguish, etc.) one or more sub-regions of the rectangular images based on one or more content measures (e.g., motion measure, disparity measure, and/or coverage measure). For instance, the electronic device 102 may partition sub-regions of the rectangular image(s) that include motion (e.g., a partitioning threshold amount of motion), disparity (e.g., a partitioning threshold amount of disparity), and/or coverage (e.g., a partitioning threshold amount of coverage). The partitioning may be adaptive based on content. A stitching scheme may be selected individually for each of the sub-regions. Selecting a stitching scheme (e.g., static seam-based stitching, dynamic seam-based stitching, or dynamic warp stitching) for each sub-region may be accomplished as follows in some configurations.

For each sub-region, the electronic device 102 may determine 1514 whether the motion measure is greater than a motion threshold. This may be accomplished as described in connection with FIG. 1. If the motion measure for a sub-region of a rectangular image is greater than the motion threshold, the electronic device 102 may select 1516 static seam-based stitching for that sub-region.

For each sub-region, if the motion measure is not greater than the motion threshold, the electronic device 102 may determine 1530 whether a match is unreliable. For example, matching of one or more patches may be unreliable due to similar image structures in some cases. For instance, images of recurring patterns (e.g., checkerboard patterns, etc.) may be difficult to reliably match. In some approaches, the electronic device may calculate a SAD measure (e.g., SAD surface) to determine corresponding features (e.g., to perform matching). In some cases with recurring patterns, multiple minima (e.g., local minima) may appear in the SAD surface due to the repeating structures. In some approaches, the electronic device 102 may determine 1530 whether a match is unreliable based on multiple minima in a matching score (e.g., SAD score, SAD surface, etc.). For example, if multiple minima occur, the electronic device 102 may use the multiple minima to designate (e.g., label, mark, etc.) unreliable matches (e.g., sub-region matches, row matches, patch matches, region-of-interest (ROI) matches, point matches, pixel set matches, etc.). In some approaches, the electronic device 102 may perform a ratio test. For example, if a ratio of the lowest minima to the second lowest minima does not meet a threshold (e.g., is not greater than a threshold, is not less than a threshold, etc.), the electronic device 102 may determine that there are multiple minima and/or that the match is unreliable. If the match is unreliable, the electronic device 102 may select 1516 static seam-based stitching for that sub-region. For example, sub-regions (e.g., rows) with unreliable matches may be stitched using static seam stitching.

If the match is reliable (e.g., not unreliable) for each sub-region, the electronic device 102 may determine 1518 whether a disparity measure is greater than a disparity threshold or whether a coverage criterion is met. This may be accomplished as described in connection with FIG. 1. If the disparity measure is not greater than the disparity threshold or if the coverage criterion is not met, the electronic device 102 may select 1520 dynamic seam-based stitching for the sub-region. This may be accomplished as described in connection with FIG. 1.

If the disparity measure is greater than the disparity threshold and if the coverage criterion is met, the electronic device 102 may select 1522 dynamic warp-based stitching for the sub-region. This may be accomplished as described in connection with FIG. 1.

The electronic device 102 may stitch 1524 each sub-region based on the one or more stitching selections. This may be accomplished as described in connection with FIG. 1. For example, the electronic device 102 may stitch 1524 overlapping sub-regions of the rectangular images based on each corresponding selected stitching scheme. Additionally or alternatively, the electronic device 102 may stitch corresponding overlapping sub-regions of the at least two images (e.g., original input images before transformation) based on the corresponding selected stitching scheme(s).

It should be noted that in some approaches, each of the sub-regions may be joined. For example, the electronic device 102 may join or merge each of the stitched sub-regions to form a stitched rectangular image.

In some configurations, the electronic device 102 may perform 1526 color correction. For example, the electronic device 102 may alter the color of one or more of the images in order to match the color between the images. In some configurations, the color correction may be gamma-based color correction. For instance, gamma coefficients may be computed from the overlapping regions (e.g., rectangular images) to equalize the color and brightness of the images (e.g., two fisheye images). Gamma values (e.g., coefficients) may be determined using a mean of the overlapping regions (e.g., rectangular images). Blindly computing the mean of the overlapping regions may lead to wrong gamma values as close-by objects can be visible in only one of the cameras in some cases. In some approaches, the electronic device 102 may utilize a threshold on the disparity measure (e.g., disparity map) to prune out the nearby objects before computing the mean. This may lead to better mean correspondence across the two overlapping regions and hence, better color and brightness equalization.

In some configurations, color correction (e.g., a color correction algorithm) may be performed as follows. Overlapping regions from two or more images may be utilized. For example, the overlapping regions may be rectangular images transformed from curved overlapping regions of fisheye camera images. The electronic device 102 may calculate gamma coefficients for Y and linear coefficients for Cb/Cr to equalize the means of the histograms of three channels in the overlapping regions. This may produce a gamma map for the Y channel for two images (e.g., overlapping regions, rectangular images, etc.). A similar procedure (e.g., input to output map) may be performed for chroma channels for the two images (e.g., overlapping regions, rectangular images, etc.). The mappings may be utilized to equalize the brightness and colors of two images while stitching.

In some approaches, the electronic device 102 may perform color correction (e.g., a gamma computation) using a disparity measure (e.g., disparity map). For example, means may be computed excluding one or more nearby objects. Nearby objects may be indicated by the disparity measure (e.g., large disparity values, disparity values above a threshold, etc.).

The electronic device 102 may optionally apply 1528 one or more maps to compute equi-rectangular images. For example, the electronic device 102 may determine and/or maintain one or more maps between original images (e.g., wide-angle images, overlapping regions of wide-angle images, etc.) and transformed images (e.g., rectangular images, sub-regions of rectangular images, etc.). The electronic device 102 may apply 1528 the map(s) in order to apply the selected stitching scheme(s) to the original images. In some configurations, stitched image may be computed in the equi-rectangular domain. For example, the electronic device 102 may stitch the equi-rectangular output in some approaches. It should be noted that other output formats may be additionally or alternatively used in the final stitching step.

It should be noted that one or more steps and/or aspects of the method 1500 may be optional and/or may be performed in different orders. For example, determining 1514 whether a motion measure is greater than a motion threshold may be carried out directly after determining 1506 the motion measure. Partitioning 1512 may then be performed based on the motion measure. In some approaches, for example, the motion partitioning threshold may be the same as the motion threshold. Accordingly, one or more sub-regions that have a motion measure greater than the motion threshold may be partitioned with static-based stitching selected. Additionally or alternatively, determining 1508 the disparity measure may be performed after one or more regions with motion are partitioned. The coverage measure may also be determined that that point in some approaches. Accordingly, content measure determination, image partitioning, and/or stitching scheme selection may be performed in different orders and/or may be performed conditionally. Additionally or alternatively, determining 1530 whether a match is unreliable may be an optional procedure.

Figure 16:
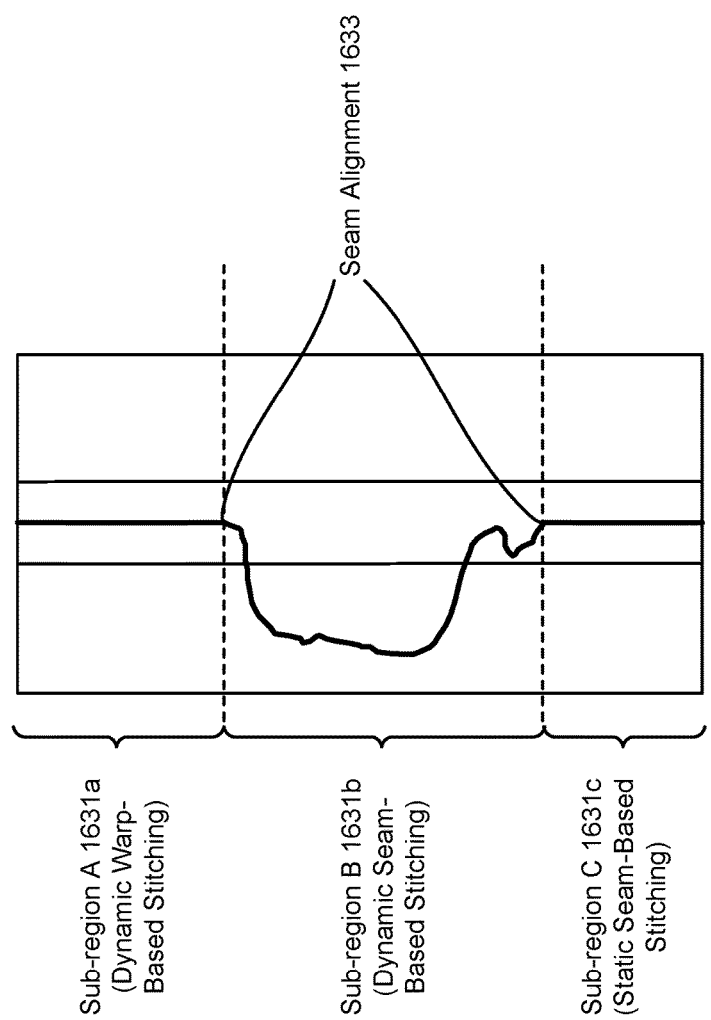
FIG. 16 is a diagram illustrating an example of seam alignment.

FIG. 16 is a diagram illustrating an example of seam alignment 1633. In particular, FIG. 16 illustrates an example of blending across multiple sub-regions 1631a-c (e.g., sub-images). In this example, dynamic warp-based stitching is selected for sub-region A 1631a, dynamic seam-based stitching is selected for sub-region B 1631b, and static seam-based stitching is selected for sub-region C 1631c. In some configurations of the systems and methods disclosed herein, one or more constraints may be utilized (in the dynamic-seam based stitching algorithm, for example) to ensure that the seams align at the sub-region boundaries (e.g., that the seam terminates at the center of the sub-region). For example, the dynamic seam in sub-region B 1631b may be constrained to align with the seam at the boundary of sub-region A 1631a, and may be constrained to align with the seam at the boundary of sub-region C 1631c. It should be noted that the seam may be within the blending region and/or the blending region may track the seam.

Figure 17:
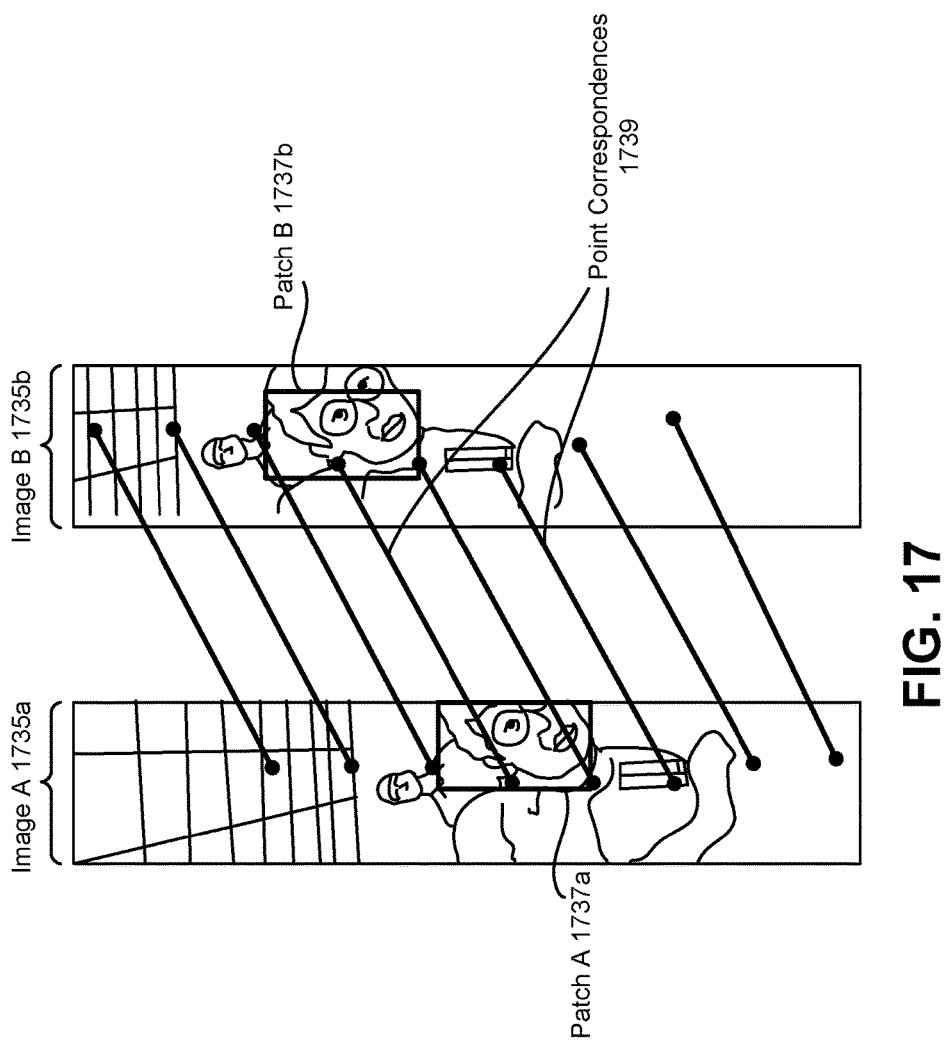
FIG. 17 is a diagram illustrating an example of disparity filtering.

FIG. 17 is a diagram illustrating an example of disparity filtering. Disparity filtering (e.g., filtering one or more disparity values from a disparity measure or map) may be employed in some configurations of the systems and methods disclosed herein. In particular, FIG. 17 illustrates image A 1735a and image B 1735b. Image A 1735a is an image captured from a left camera, while image B 1735b is an image captured from a right camera. Some point correspondences 1739 (e.g., point matches) are illustrated between image A 1735a and image B 1735b. As can be observed, objects (e.g., faces) in image A 1735a are shifted relative to corresponding objects in image B 1735b. For example, patch A 1737a in image A 1735a is shifted to the left in image B 1735b. Similarly, patch B 1737b in image B 1735b is shifted to the right in image A 1735a. Disparity values that violate this constraint may be eliminated. For example, disparity values that do not agree with the general disparity direction may be eliminated. For instance, a disparity value indicating a left shift in image B 1735b may be eliminated, since such a disparity would not exist due to the geometry of the camera setup. Additionally or alternatively, large disparity values (e.g., disparity values that are greater than a threshold and/or disparity values that would indicate an exit from the overlapping region) may not be considered. For example, if a disparity value indicates a shift that would go beyond the overlapping region (e.g., beyond an overlapping region border) may be filtered out. Accordingly, the electronic device 102 may filter one or more disparity values that disagree with the camera geometry and/or one or more disparity values that are too large.

Figure 18:
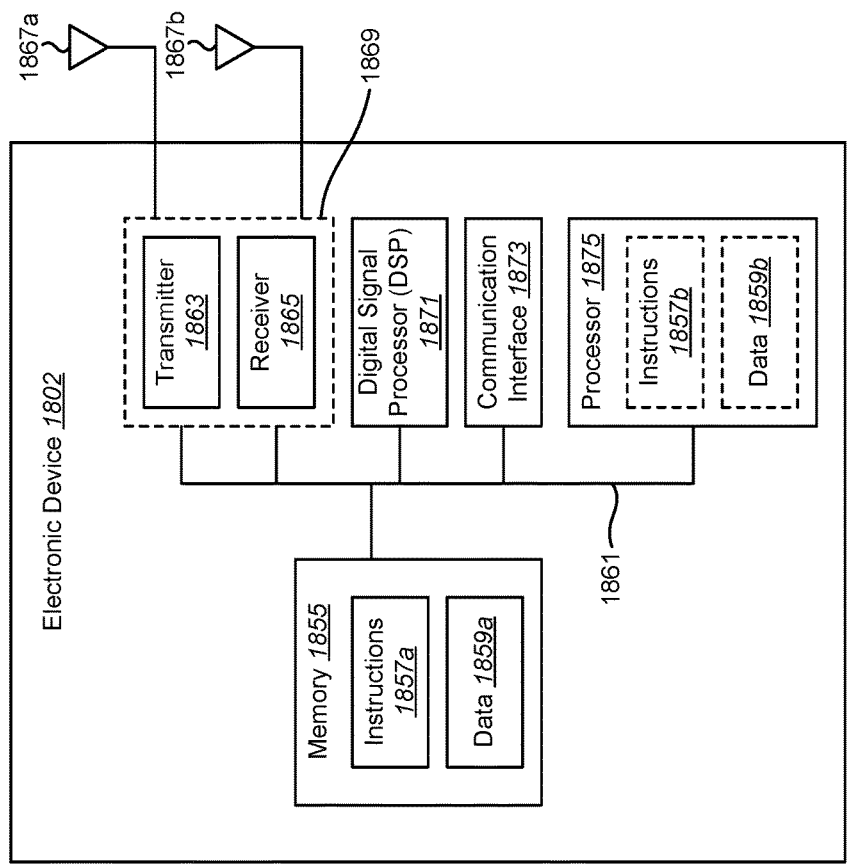
FIG. 18 illustrates certain components that may be included within an electronic device.

FIG. 18 illustrates certain components that may be included within an electronic device 1802. The electronic device 1802 may be an example of and/or may be implemented in accordance with the electronic device 102 described in relation to FIG. 1. The electronic device 1802 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1802 includes a processor 1875. The processor 1875 may be a general purpose single- or multi-chip microprocessor (e.g., an ARM), a special purpose microprocessor (e.g., a digital signal processor (DSP)), a microcontroller, a programmable gate array, etc. The processor 1875 may be referred to as a central processing unit (CPU). Although just a single processor 1875 is shown in the electronic device 1802, in an alternative configuration, a combination of processors (e.g., an ARM and DSP) could be used.

The electronic device 1802 also includes memory 1855. The memory 1855 may be any electronic component capable of storing electronic information. The memory 1855 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1859*a* and instructions 1857*a* may be stored in the memory 1855. The instructions 1857*a* may be executable by the processor 1875 to implement one or more of the methods 200, 1400, 1500 described herein. Executing the instructions 1857*a* may involve the use of the data 1859*a* that is stored in the memory 1855. When the processor 1875 executes the instructions 1857, various portions of the instructions 1857*b* may be loaded onto the processor 1875, and various pieces of data 1859*b* may be loaded onto the processor 1875.

The electronic device 1802 may also include a transmitter 1863 and a receiver 1865 to allow transmission and reception of signals to and from the electronic device 1802. The transmitter 1863 and receiver 1865 may be collectively referred to as a transceiver 1869. One or multiple antennas 1867*a*-*b* may be electrically coupled to the transceiver 1869. The electronic device 1802 may also include (not shown) multiple transmitters, multiple receivers, multiple transceivers and/or additional antennas.

The electronic device 1802 may include a digital signal processor (DSP) 1871. The electronic device 1802 may also include a communication interface 1873. The communication interface 1873 may enable one or more kinds of input and/or output. For example, the communication interface 1873 may include one or more ports and/or communication devices for linking other devices to the electronic device 1802. Additionally or alternatively, the communication interface 1873 may include one or more other interfaces (e.g., touchscreen, keypad, keyboard, microphone, camera, etc.). For example, the communication interface 1873 may enable a user to interact with the electronic device 1802.

The various components of the electronic device 1802 may be coupled together by one or more buses, which may include a power bus, a control signal bus, a status signal bus, a data bus, etc. For the sake of clarity, the various buses are illustrated in FIG. 18 as a bus system 1861.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for stitching images by an electronic device, comprising:
    obtaining at least two images;
    selecting a stitching scheme from a set of stitching schemes based on one or more content measures including an object coverage measure that indicates a span of an object in at least a portion of at least one of the at least two images, wherein the set of stitching schemes includes a first stitching scheme, a second stitching scheme, and a third stitching scheme; and
    stitching the at least two images based on a selected stitching scheme.

2. The method of claim 1, wherein stitching the at least two images produces a surround view image of a scene.

3. The method of claim 1, wherein the at least two images are fisheye images, and wherein the method further comprises transforming overlapping outer regions of the at least two images into rectangular images using a geometrical transformation.

4. The method of claim 1, further comprising determining sub-regions of an overlapping region of the at least two images based on the one or more content measures.

5. The method of claim 4, further comprising performing selecting the stitching scheme for each of the sub-regions.

6. The method of claim 5, wherein different stitching schemes are selected for at least two of the sub-regions.

7. The method of claim 1, wherein the one or more content measures further comprise a motion measure.

8. The method of claim 1, wherein the first stitching scheme is static seam-based stitching, the second stitching scheme is dynamic seam-based stitching, and the third stitching scheme is dynamic warp stitching.

9. The method of claim 8, wherein selecting the stitching scheme comprises:
    selecting static seam-based stitching in a case that a motion measure is greater than a motion threshold;
    determining whether a match is unreliable in a case that the motion measure is not greater than the motion threshold; and
    selecting static seam-based stitching in a case that the match is unreliable.

10. The method of claim 8, wherein selecting the stitching scheme comprises selecting dynamic warp stitching in a case that a disparity measure is greater than a disparity threshold or the object coverage measure meets a coverage criterion.

11. The method of claim 8, wherein selecting the stitching scheme comprises selecting dynamic seam-based stitching in a case that a disparity measure is not greater than a disparity threshold and the object coverage measure does not meet a coverage criterion.

12. The method of claim 1, further comprising:
    selecting a blending region based on at least one of a motion measure or a disparity measure; and
    blending the at least two images in the blending region.

13. The method of claim 1, wherein stitching the at least two images comprises performing color correction based on a disparity measure.

14. The method of claim 1, further comprising constraining a dynamic seam to align at a sub-region boundary in a case that the selected stitching scheme is dynamic seam-based stitching.

15. An electronic device for stitching images, comprising:
    a memory;
    a processor coupled to the memory, wherein the processor is configured to:
        obtain at least two images;
        select a stitching scheme from a set of stitching schemes based on one or more content measures including an object coverage measure that indicates a span of an object in at least a portion of at least one of the at least two images, wherein the set of stitching schemes includes a first stitching scheme, a second stitching scheme, and a third stitching scheme; and
        stitch the at least two images based on a selected stitching scheme.

16. The electronic device of claim 15, wherein stitching the at least two images produces a surround view image of a scene.

17. The electronic device of claim 16, wherein the at least two images are fisheye images, and wherein the processor is configured to transform overlapping outer regions of the at least two images into rectangular images using a geometrical transformation.

18. The electronic device of claim 15, wherein the processor is configured to determine sub-regions of an overlapping region of the at least two images based on the one or more content measures.

19. The electronic device of claim 18, wherein the processor is configured to perform selecting the stitching scheme for each of the sub-regions.

20. The electronic device of claim 19, wherein different stitching schemes are selected for at least two of the sub-regions.

21. The electronic device of claim 15, wherein the one or more content measures further comprise a motion measure.

22. The electronic device of claim 15, wherein the first stitching scheme is static seam-based stitching, the second stitching scheme is dynamic seam-based stitching, and the third stitching scheme is dynamic warp stitching.

23. The electronic device of claim 22, wherein the processor is configured to select the stitching scheme by:
    selecting static seam-based stitching in a case that a motion measure is greater than a motion threshold;
    determining whether a match is unreliable in a case that the motion measure is not greater than the motion threshold; and
    selecting static seam-based stitching in a case that the match is unreliable.

24. The electronic device of claim 22, wherein the processor is configured to select the stitching scheme by selecting dynamic warp stitching in a case that a disparity measure is greater than a disparity threshold or the object coverage measure meets a coverage criterion.

25. The electronic device of claim 22, wherein the processor is configured to select the stitching scheme by selecting dynamic seam-based stitching in a case that a disparity measure is not greater than a disparity threshold and the object coverage measure does not meet a coverage criterion.

26. The electronic device of claim 15, wherein the processor is configured to:
   select a blending region based on at least one of a motion measure or a disparity measure; and
   blend the at least two images in the blending region.

27. The electronic device of claim 15, wherein the processor is configured to stitch the at least two images by performing color correction based on a disparity measure.

28. The electronic device of claim 15, wherein the processor is configured to constrain a dynamic seam to align at a sub-region boundary in a case that the selected stitching scheme is dynamic seam-based stitching.

29. A non-transitory tangible computer-readable medium storing computer executable code, comprising:
   code for causing an electronic device to obtain at least two images;
   code for causing the electronic device to select a stitching scheme from a set of stitching schemes based on one or more content measures including an object coverage measure that indicates a span of an object in at least a portion of at least one of the at least two images, wherein the set of stitching schemes includes a first stitching scheme, a second stitching scheme, and a third stitching scheme; and
   code for causing the electronic device to stitch the at least two images based on a selected stitching scheme.

30. The computer-readable medium of claim 29, further comprising code for causing the electronic device to determine sub-regions of overlapping regions of the at least two images based on the one or more content measures.

* * * * *